United States Patent
Causse et al.

(10) Patent No.: US 12,541,928 B2
(45) Date of Patent: Feb. 3, 2026

(54) API TO PROVIDE PRODUCT CARDS GENERATED BY AUGMENTED REALITY CONTENT GENERATORS

(71) Applicant: Snap Inc., Santa Monica, CA (US)

(72) Inventors: Helene Causse, Seattle, WA (US); Valentyn Fuchedzhy, Odesa (UA); Amin Madani, Los Angeles, CA (US); Alan Rawcliffe, Seattle, WA (US); Vincent Sung, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 159 days.

(21) Appl. No.: 18/147,941

(22) Filed: Dec. 29, 2022

(65) Prior Publication Data

US 2023/0215118 A1  Jul. 6, 2023

Related U.S. Application Data

(60) Provisional application No. 63/295,433, filed on Dec. 30, 2021.

(51) Int. Cl.
*G06T 19/00* (2011.01)
*G06F 9/54* (2006.01)
*G06Q 30/0601* (2023.01)

(52) U.S. Cl.
CPC ............ *G06T 19/006* (2013.01); *G06F 9/542* (2013.01); *G06Q 30/0641* (2013.01)

(58) Field of Classification Search
CPC ... G06T 19/006; G06F 9/542; G06Q 30/0641; G06Q 30/0643
See application file for complete search history.

(56) References Cited

U.S. PATENT DOCUMENTS

| | | | |
|---|---|---|---|
| 10,242,477 B1* | 3/2019 | Charlton | H04L 67/306 |
| 2014/0310056 A1* | 10/2014 | Alapati | G06Q 50/01 |
| | | | 705/7.28 |

(Continued)

FOREIGN PATENT DOCUMENTS

| | | |
|---|---|---|
| CN | 118661190 A | 9/2024 |
| WO | WO-2023129999 A1 | 7/2023 |

OTHER PUBLICATIONS

"International Application Serial No. PCT/US2022/082521, International Search Report mailed Apr. 14, 2023", 5 pgs.

(Continued)

*Primary Examiner* — Michael Le
(74) *Attorney, Agent, or Firm* — Schwegman Lundberg & Woessner, P.A.

(57) ABSTRACT

The subject technology receives a selection of a first representation of a product from a set of representations of products. The subject technology renders for display the first representation of the product based on metadata using an extension application programming interface (API). The subject technology determines augmented reality (AR) content that is stored remotely using the extension API. The subject technology sends a first request for remote AR content to a camera API using the extension API. The subject technology sends a second request for retrieving the remote AR content using the camera API. The subject technology renders the remote AR content using the camera API. The subject technology receives a notification that the remote AR content was rendered for display from the extension API.

17 Claims, 26 Drawing Sheets

(56) References Cited

U.S. PATENT DOCUMENTS

| | | | | |
|---|---|---|---|---|
| 2018/0308287 A1* | 10/2018 | Daniels | ............... | G06F 3/04845 |
| 2019/0179405 A1 | 6/2019 | Sun et al. | | |
| 2019/0342240 A1* | 11/2019 | Garrido | ................ | H04L 51/063 |
| 2021/0074068 A1* | 3/2021 | Spivack | ................ | G06N 20/00 |
| 2021/0243503 A1* | 8/2021 | Kotsopoulos | ........ | H04N 21/472 |
| 2021/0303855 A1* | 9/2021 | Anvaripour | ............. | G06T 11/60 |
| 2021/0304505 A1 | 9/2021 | Anvaripour et al. | | |
| 2021/0345016 A1* | 11/2021 | Nakano | ............... | G06F 18/2413 |
| 2021/0389996 A1* | 12/2021 | Charlton | ................ | G06T 11/00 |
| 2021/0390781 A1* | 12/2021 | Charlton | ............... | G06T 19/006 |
| 2023/0086979 A1* | 3/2023 | Li | ........................... | H04L 67/52 |
| | | | | 709/217 |

OTHER PUBLICATIONS

"International Application Serial No. PCT/US2022/082521, Written Opinion mailed Apr. 14, 2023", 6 pgs.

"International Application Serial No. PCT/US2022/082521, International Preliminary Report on Patentability mailed Jul. 11, 2024", 8 pgs.

"European Application Serial No. 22854743.6, Response to Communication Pursuant to Rules 161 and 162 EPC Filed Jan. 28, 2025", 18 pgs.

* cited by examiner

API TO PROVIDE PRODUCT CARDS GENERATED BY AUGMENTED REALITY CONTENT GENERATORS

PRIORITY CLAIM

This application claims the benefit of priority of U.S. Provisional Patent Application No. 63/295,433, filed Dec. 30, 2021, which is hereby incorporated by reference herein in its entirety for all purposes.

BACKGROUND

This application relates generally to, utilizing electronic devices, providing augmented reality experiences of physical products.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
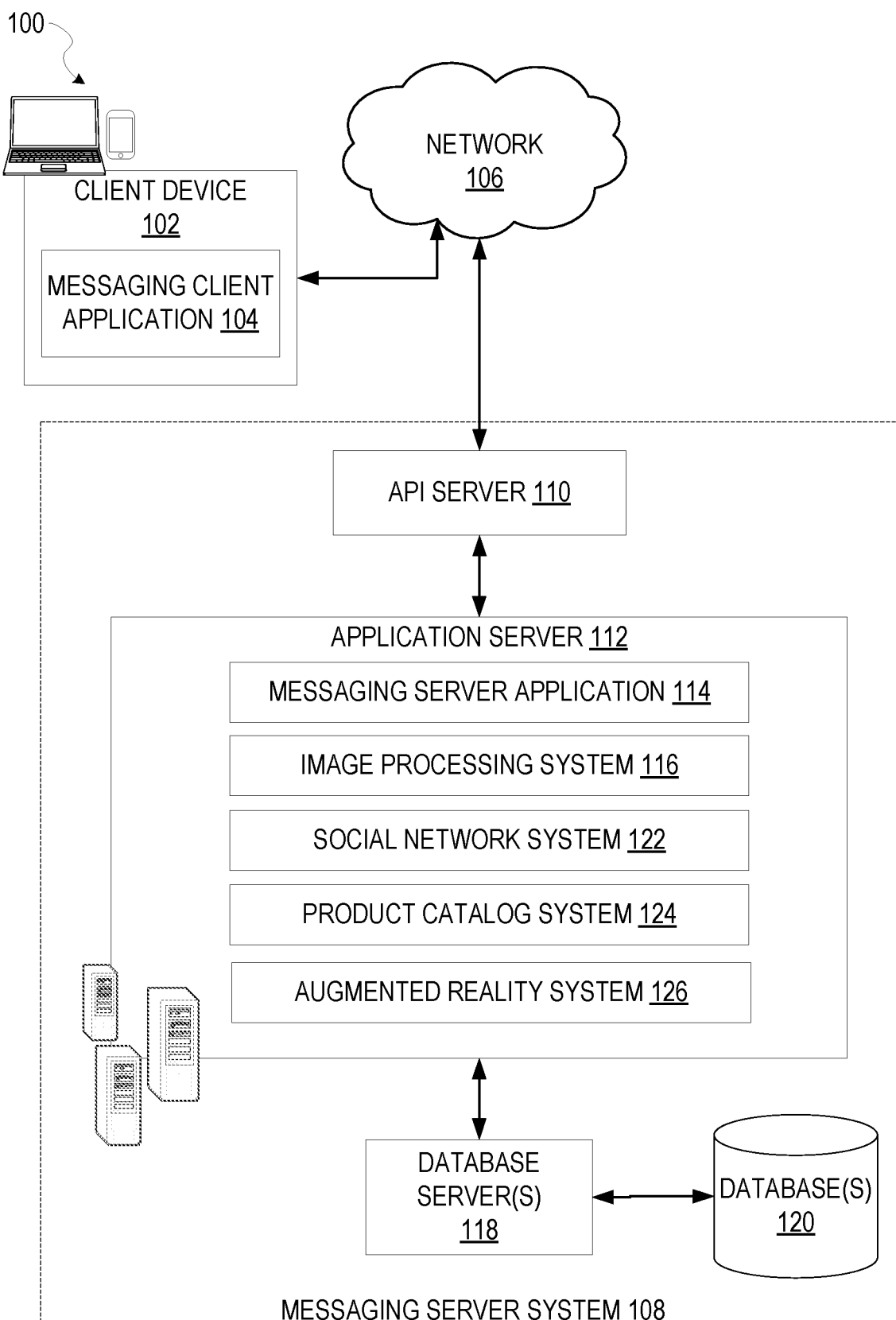
FIG. 1 is a diagrammatic representation of a networked environment in which the present disclosure may be deployed, in accordance with some example embodiments.

With the increased use of digital images, affordability of portable computing devices, availability of increased capacity of digital storage media, and increased bandwidth and accessibility of network connections, digital images have become a part of the daily life for an increasing number of people. Users with a range of interests from various locations can capture digital images of various subjects and make captured images available to others via networks, for example the Internet. For enhancing users' experiences with digital images and content using augmented reality, and enabling computing devices to identify various objects or features captured in a wide range of changing conditions (e.g., changes in image scales, noises, lighting, movement, or geometric distortion) can be challenging and computationally intensive. In an aspect, the subject technology provides an improved system for providing augmented reality experiences of products (which can be purchased) that are then applied to such objects (e.g., a user's face) as described further herein.

Messaging systems are frequently utilized, and are increasingly leveraged by users of mobile computing devices, in various settings, to provide different types of functionality in a convenient manner. As described herein, the subject messaging system provides a practical application that enables providing augmented reality experiences for products. The subject messaging system performs a process to access additional information related to a given product based on product metadata, while leveraging the capabilities of the subject message system. The subject messaging system can render an augmented reality (AR) experience(s), in connection with the product, in a scene with an object(s) such as a user's face, along with providing product information, or other information. In an example, the AR experience provides AR content that is applied to the object such as a representation of the user's face or other part of the user's body (e.g., arm, leg, and the like) for display on a given client device. Such AR content can be related to the product, such as rendering how a beauty product would appear on the representation of the user's face.

As also described herein, the subject messaging system provides a practical application that enables identification of physical items or products based on image data captured by a given client device (e.g., mobile computing device) and provided to the subject messaging system for analysis. In particular, a given user of the subject messaging system can capture an image or set of images of a physical item that includes a physical identification indicator, such as a barcode, that may identify the physical item. The subject messaging system extracts product metadata from the physical identification indicator, and performs a process to determine additional product metadata, while leveraging the capabilities of the subject message system. Thus, the subject technology is understood to advantageously provide technical improvements in presenting AR content items to facilitate a natural and intuitive presentation of AR content (e.g., without lag and dropping frames due to graphical bottlenecks and inefficient processing of AR content) and thereby increase a sense of presence in an environment including a mixture of (real) physical items and AR content items.

In an example, the technical improvements also involve utilizing server or remote computing resources to process and render AR content, while in yet another example, AR content can be rendered by a given computing device and then propagated to other computing devices for presentation. Through the combination and utilization of various techniques described herein, a latency of displaying AR content items (e.g., a duration of time(s) for the AR content to be generated and subsequently rendered on the respective display of a given device can be reduced), in comparison with other existing implementations, to provide a more immersive and compelling user experience.

As referred to herein, the phrase "augmented reality experience," "augmented reality content item," "augmented reality content generator" includes or refers to various image processing operations corresponding to an image modification, filter, LENSES, media overlay, transformation, and the like, as described further herein.

FIG. 1 is a block diagram showing an example of a messaging system 100 for exchanging data (e.g., messages and associated content) over a network. The messaging system 100 includes multiple instances of a client device 102, each of which hosts a number of applications including a messaging client application 104. Each messaging client application 104 is communicatively coupled to other instances of the messaging client application 104 and a messaging server system 108 via a network 106 (e.g., the Internet).

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, an image processing system 116, a social network system 122, a product catalog system 124, and an augmented reality system 126. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

Figure 3:
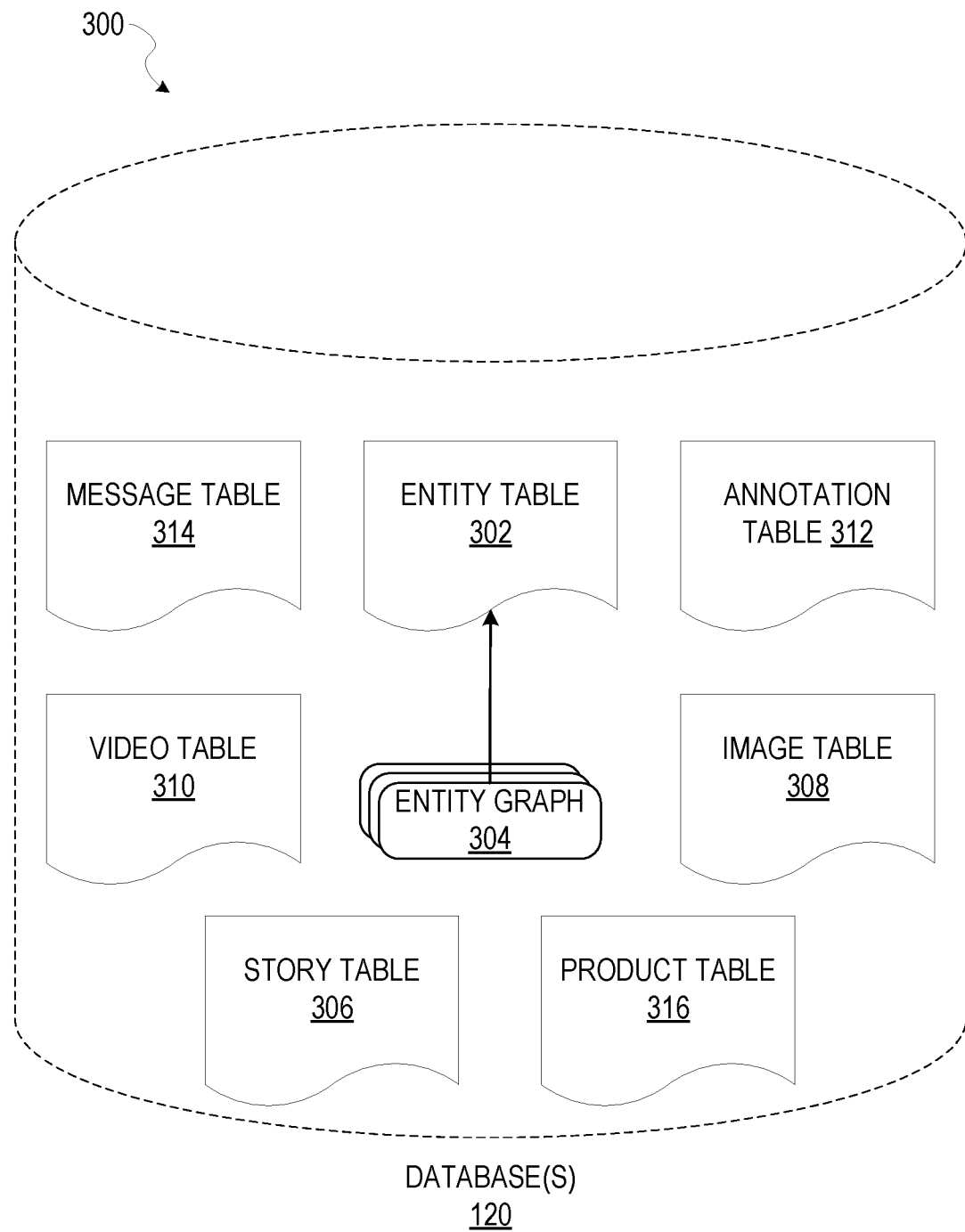
FIG. 3 is a diagrammatic representation of a data structure as maintained in a database, in accordance with some example embodiments.

The social network system 122 supports various social networking functions services, and makes these functions and services available to the messaging server application 114. To this end, the social network system 122 maintains and accesses an entity graph 304 (as shown in FIG. 3) within the database 120. Examples of functions and services supported by the social network system 122 include the identification of other users of the messaging system 100 with which a particular user has relationships or is "following", and also the identification of other entities and interests of a particular user.

The messaging client application 104 includes a set of functions that allows the client device 102 to access the augmented reality system 126. The augmented reality system 126 generates and maintains a list of augmented reality content generators. A given augmented reality content generator may correspond to an augmented reality content item (or some other image modification, image processing, transformation, modification, and the like) for supplementing captured image data or video data with augmented reality content in order to provide an augmented reality experience(s).

In one or more embodiments, the augmented reality system 126 identifies an object depicted in the one or more images captured by the messaging client application 104, and determines one or more attributes of the object. The augmented reality system 126 searches for one or more augmented reality content items (e.g., virtual objects) that are associated with the one or more attributes of the object, and ranks the virtual objects (e.g., based on the associations and weights assigned to each of the attributes). The augmented reality system 126 causes one or more virtual objects or graphical elements of the highest ranked augmented reality content item to be presented on top of the captured image.

The application server 112 is communicatively coupled to a database server 118, which facilitates access to a database 120 in which is stored data associated with messages processed by the messaging server application 114.

The product catalog system 124 performs operations for verifying products based at least on image data of such products provided by the messaging client application 104. In an embodiment, the product catalog system 124 may store information (e.g., metadata) related to manufacturers of such products, and information utilized for verifying the authenticity of the products, in the database 120. The product catalog system 124 is discussed in further detail with respect to FIG. 6 below.

Figure 2:
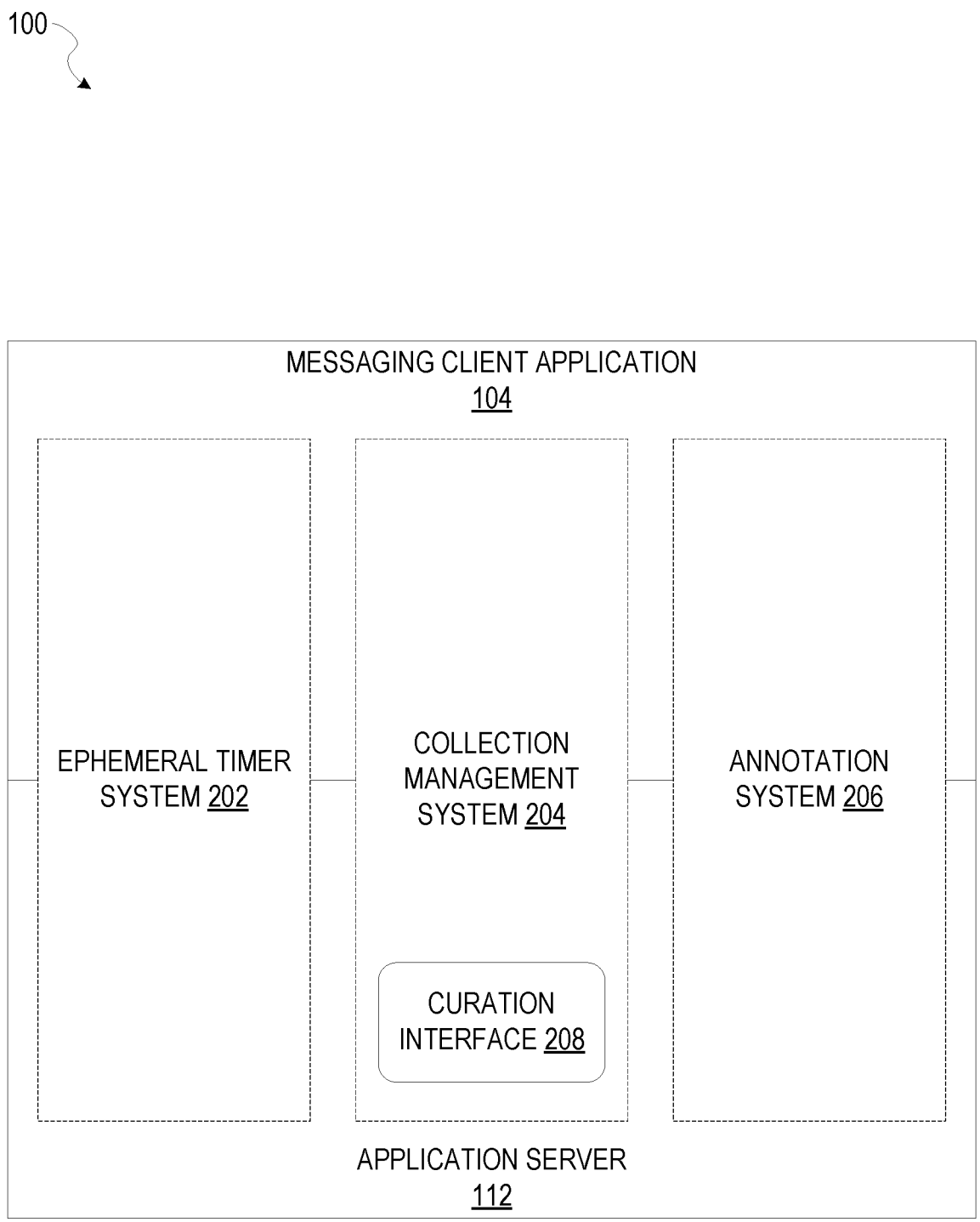
FIG. 2 is a diagrammatic representation of a messaging client application, in accordance with some example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay or supplementation (e.g., an image filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

FIG. 3 is a schematic diagram illustrating data structures 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 308 are augmented reality content generators (e.g., corresponding to applying LENSES, augmented reality experiences, or augmented reality content items). An augmented reality content generator may be a real-time special effect and sound that may be added to an image or a video.

As described above, augmented reality content generators, augmented reality content items, overlays, image transformations, AR images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified. For example, in a device with access to multiple augmented reality content generators, a user can use a single video clip with multiple augmented reality content generators to see how the different augmented reality content generators will modify the stored clip. For example, multiple augmented reality content generators that apply different pseudorandom movement models can be applied to the same content by selecting different augmented reality content generators for the content. Similarly, real-time video capture may be used with an illustrated modification to show how video images currently being captured by sensors of a device would modify the captured data. Such data may simply be displayed on the screen and not stored in memory, or the content captured by the device sensors may be recorded and stored in memory with or without the modifications (or both). In some systems, a preview feature can show how different augmented reality content generators will look within different windows in a display at the same time. This can, for example, enable multiple windows with different pseudorandom animations to be viewed on a display at the same time.

Data and various systems using augmented reality content generators or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a three-dimensional mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g., images or frames of video). Augmented reality content generators thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some embodiments, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some embodiments of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. In an initial landmark is not identifiable (e.g., if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of a transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some example embodiments, a computer animation model to transform image data can be used by a system where a user may capture an image or video stream of the user (e.g., a selfie) using a client device 102 having a neural network operating as part of a messaging client application 104 operating on the client device 102. The transform system operating within the messaging client application 104 determines the presence of a face within the image or video stream and provides modification icons associated with a computer animation model to transform image data, or the computer animation model can be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some embodiments, the graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

In some example embodiments, a graphical processing pipeline architecture is provided that enables different augmented reality experiences (e.g., AR content generators) to be applied in corresponding different layers. Such a graphical processing pipeline provides an extensible rendering engine for providing multiple augmented reality experiences that are included in a composite media (e.g., image or video) for rendering by the messaging client application 104 (or the messaging system 100).

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

The database 120 also stores data of products in a product table 316, which enables the product catalog system 124 to perform operations related to providing an augmented reality experience with respect to a product (e.g., a given physical item that may be available for purchase or sale). In an example, the product table 316 includes a directory (e.g., listing) of products and their associated product identifiers, which can be compared against product metadata provided by the product catalog system 124. As described further herein, the product catalog system 124 can determine product metadata associated with a particular product. Such product metadata, as described further below, include a product identifier, which can be utilized as part of a process for providing an augmented reality experience in connection with the product.

Figure 4:
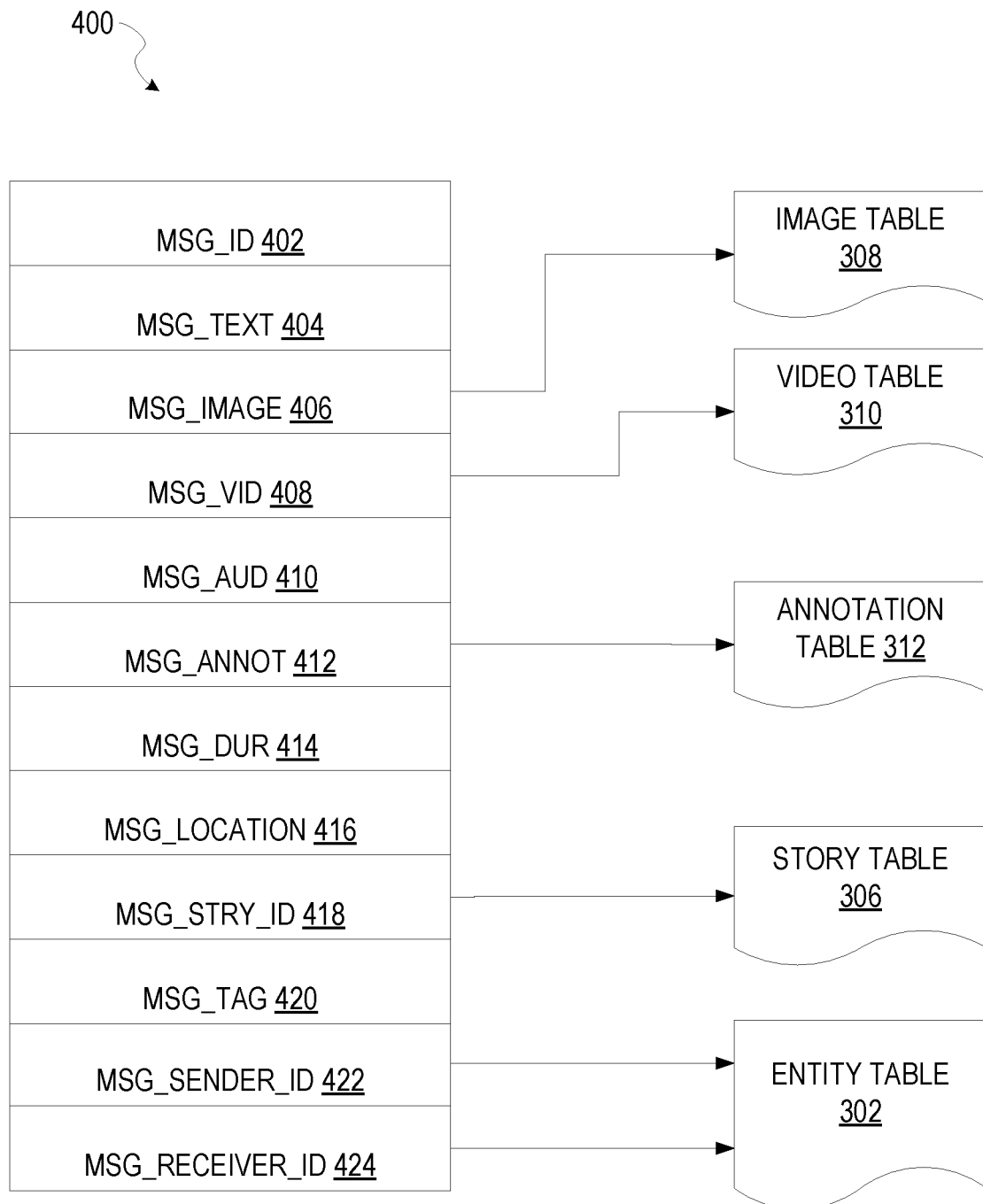
FIG. 4 is a diagrammatic representation of a message, in accordance with some example embodiments.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 404: text, to be generated by a user via a user interface of the client device 102 and that is included in the message 400.
- A message image payload 406: image data, captured by a camera component of a client device 102 or retrieved from a memory component of a client device 102, and that is included in the message 400.
- A message video payload 408: video data, captured by a camera component or retrieved from a memory component of the client device 102 and that is included in the message 400.
- A message audio payload 410: audio data, captured by a microphone or retrieved from a memory component of the client device 102, and that is included in the message 400.
- A message annotations 412: annotation data (e.g., filters, stickers or other enhancements) that represents annotations to be applied to message image payload 406, message video payload 408, or message audio payload 410 of the message 400.
- A message duration parameter 414: parameter value indicating, in seconds, the amount of time for which content of the message (e.g., the message image payload 406, message video payload 408, message audio payload 410) is to be presented or made accessible to a user via the messaging client application 104.
- A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
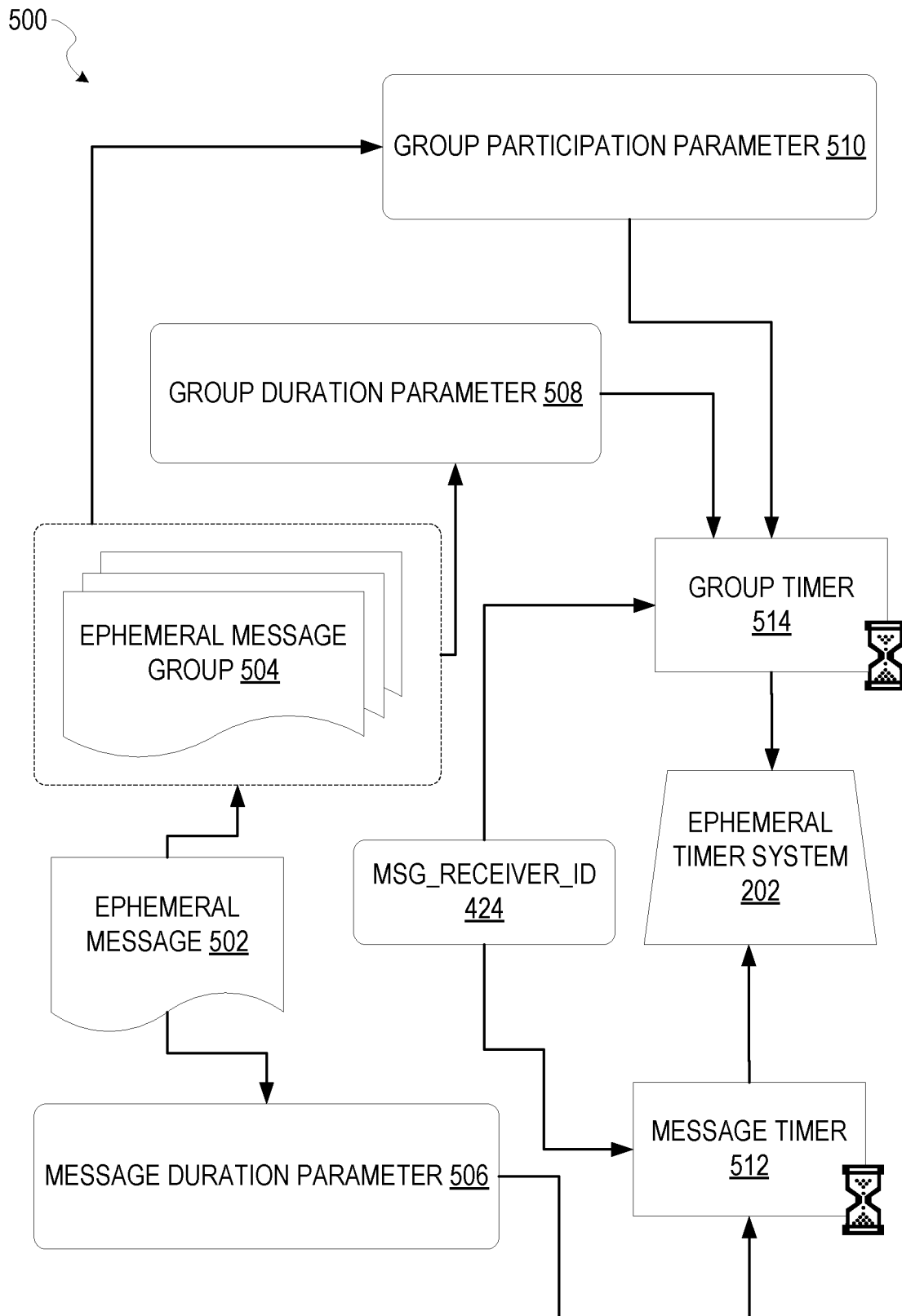
FIG. 5 is a flowchart for an access-limiting process, in accordance with some example embodiments.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized implementation of the ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time-duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one embodiment, each and every ephemeral message 502 within the ephemeral message group 504 remains viewable and accessible for a time-period specified by the group duration parameter 508. In a further embodiment, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 either when the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message group 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
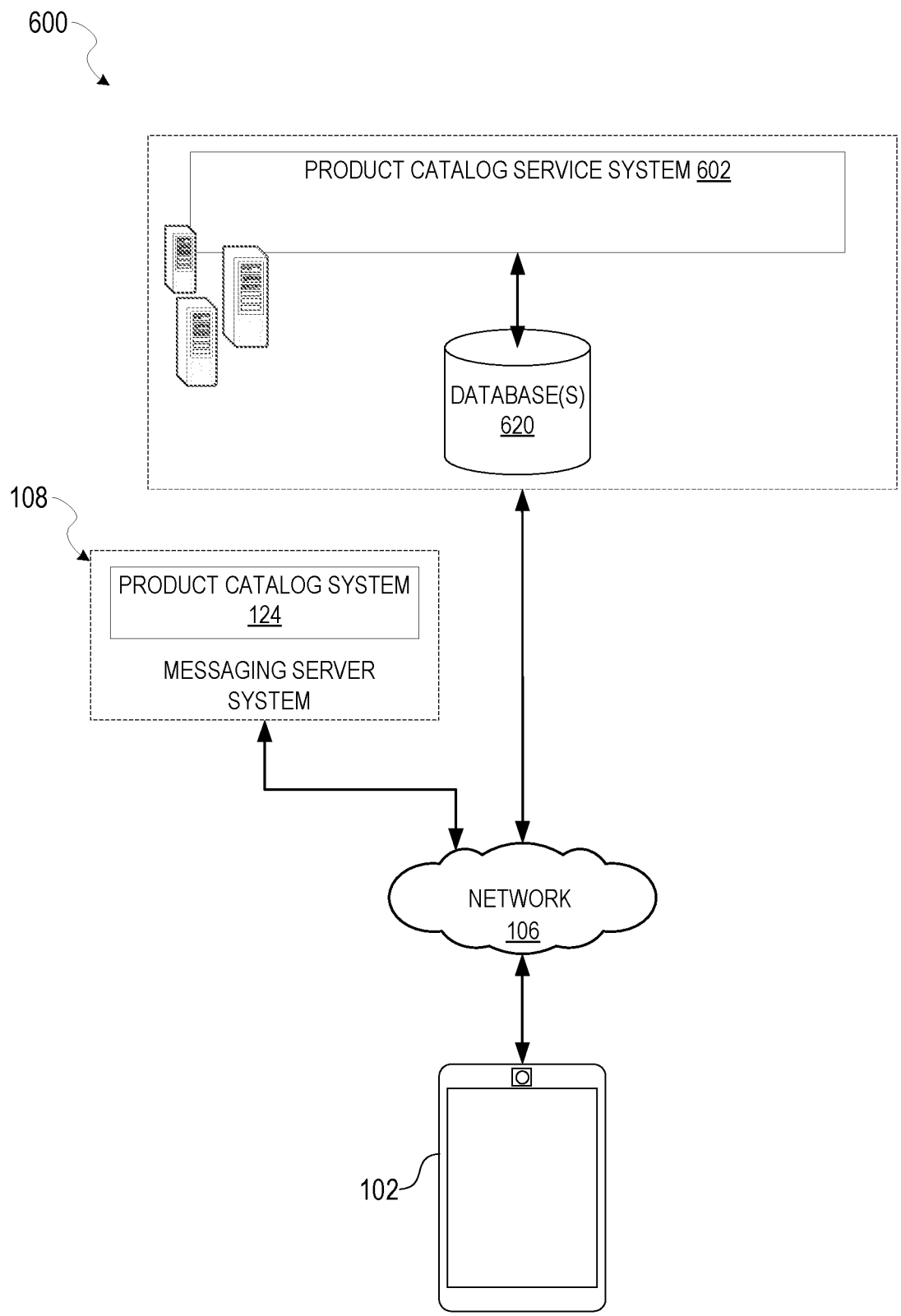
FIG. 6 is a block diagram showing an example network environment for accessing a product catalog service for products (e.g., physical items), including portions of the messaging system discussed above in FIG. 1, according to some example embodiments.

FIG. 6 is a block diagram showing an example network environment 600 for accessing information from a product catalog service for products (e.g., physical items for sale), including portions of the messaging system 100 discussed above in FIG. 1, according to some example embodiments. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

For explanatory purposes, the network environment 600 is illustrated in FIG. 6 as including the client device 102, the messaging server system 108, and a product catalog service system 602; however, the network environment 600 may include any number of electronic devices and any number of servers or a data center including multiple servers in some embodiments.

In one or more implementations, the network 106 may be an interconnected network of electronic devices that may include, or may be communicatively coupled to, the Internet. The network 106 may communicatively (directly or indirectly) couple, for example, the client device 102 with the messaging server system 108 or the product catalog service system 602.

The messaging server system 108 or the product catalog service system 602 may be part of a network of computers or a group of servers, such as in a cloud computing or data center implementation. The messaging server system 108 or the product catalog service system 602 store or generate information that are requested or received by the client device 102 as described further below.

As illustrated, the client device 102, which hosts a number of applications including the messaging client application 104 as described before in FIG. 1, is communicatively coupled to other instances of the messaging client application 104 (e.g., on another client device 102), and the messaging server system 108 via the network 106. The messaging server system 108 includes the product catalog system 124 as described above in FIG. 1.

In an example embodiment, the client device 102 may select or access an augmented reality (AR) experience, such as an augmented reality (AR) content generator, and the like for a given product, by using the product catalog system 124. The product catalog system 124 may access a product catalog service system 602, which provides product information/metadata in one or more databases 620 regarding respective products.

The product catalog system 124 can receive at least an indicator of a selected AR experience (e.g., a product AR experience ID as described further herein) from the client device 102, and perform a lookup, search, or select operation on the product table 316 to retrieve the product metadata from the database 120. In an example embodiment, such product metadata includes a product identifier (ID). The product catalog system 124 provides the client device 102 with the aforementioned product metadata, which enables the client device 102 to access or initiate the selected AR experience for display on the client device 102.

In an example embodiment, the client device 102 may provide image data including a representation of a physical item (e.g., captured using a camera provided by the client device 102) including an identification indicator (e.g., a physical barcode, etc.) of the physical item, and analyze the image data to extract information (e.g., verification metadata from the barcode) from the identification indicator. The extracted information may include a manufacturer identifier (ID), a product ID, or an item unique ID (e.g., unique serial number, etc.).

The product catalog system 124 can receive the aforementioned extracted information from the client device 102, and determine additional product information (e.g., product metadata). Additional product metadata of a given physical item may be determined based at least in part on a set of signals (e.g., provided by the client device 102 or the product catalog system 124) including information that respective manufacturers have maintained regarding individual products including, but not limited to, barcodes, Universal Product Code (UPC) codes, QR codes, Snapcodes™, unique individual serial numbers, stock keeping unit numbers, vehicle identification numbers, European article numbers (EAN), international standard book numbers (ISBN), manufacturer part numbers (MPN), global trade item number (GTIN), Japanese article numbers (JAN), watermarks, and the like. Other signals that may be utilized can include location information (e.g., GPS coordinates to determine a particular reseller or retail, or geographic region corresponding to the physical item), network information (e.g., Wi-Fi network), etc. Further, it is appreciated that the physical item can include a respective physical identification indicator(s) based on one or more of the aforementioned standards or formats for identifying individual products.

The product catalog system 124 can receive at least the product ID from the client device 102 (or the product catalog system 124 as discussed below), and perform a lookup, search, or select operation on the product table 316 to retrieve the product metadata from the database 120. The product catalog system 124 then provides the client device 102 or the product catalog system 124 with the aforementioned product metadata.

For purposes of populating the product table 316, the product catalog system 124 can communicate with the product catalog service system 602. In an example, the product catalog system 124 can send a request message to a respective server for obtaining metadata related to a given physical item. The request message may include, for example, the product ID. In an embodiment, such a server is, as further illustrated in the network environment 600, the product catalog service system 602. The product catalog service system 602, in an embodiment, is implemented as an electronic-based service (e.g., web service) that can be accessed by a given client electronic device, such as the client device 102, based on a request message including the product ID in a particular message protocol. In response to the request message, the product catalog service system 602 can perform a search or database query, based on the included product ID in the request message, for information or metadata related to the physical item.

In response to the request message, the product catalog service system 602 can provide a response message to the product catalog system 124, which includes, in an example embodiment, the information from the database 620 in response to the request. The product catalog system 124 can store the received information into the database 120. Based at least on information retrieved from the database 120 related to the product, the client device 102 can provide for display (e.g., rendering on a UI of the messaging client application 104) an AR experience for the product.

In an embodiment, the client device 102 as described above in FIG. 6 may be, for example, a portable computing device such as a laptop computer, a smartphone, a peripheral device (e.g., a digital camera), a tablet device, a wearable device such as a watch, a band, a headset, and the like, or any other appropriate device. Each of the aforementioned device may also support touchscreen gestures (e.g., through use of a touchscreen) or non-touch gestures (e.g., through use of a gyroscope or motion sensor). In one or more implementations, the client device 102 may support touchscreen-like gestures, such as in a virtual reality or augmented reality environment. In FIG. 6, by way of example, the client device 102 is depicted as a mobile electronic device with a touchscreen. In one or more implementations, the client device 102 may be, or may include all or part of, a machine as described further below. The client device 102 may include components that perform operations for providing AR experiences of physical items (e.g., products) as described in further detail below.

In an embodiment, the client device 102 is a head mounted portable system, wearable by a user, that includes a system capable of capturing images, audio, videos, multimedia content, and the like, based on a user's surrounding physical environment.

As described further herein, the client device 102 can perform a set of image, text, or object recognition processes to extract product metadata from captured image data in which the image data can include a representation of a physical item corresponding to a product and a physical identification indicator (e.g., a barcode) corresponding to the physical item.

As discussed before, the client device 102 may provide image data including a representation of a physical item (e.g., captured using a camera provided by the client device 102) including an identification indicator (e.g., a physical barcode, etc.) of the physical item, and analyze the image data to extract information (e.g., product metadata from the barcode) from the identification indicator. The extracted information may include a manufacturer identifier (ID), a product ID, or an item unique ID (e.g., unique serial number, etc.), and the like.

Figure 7:
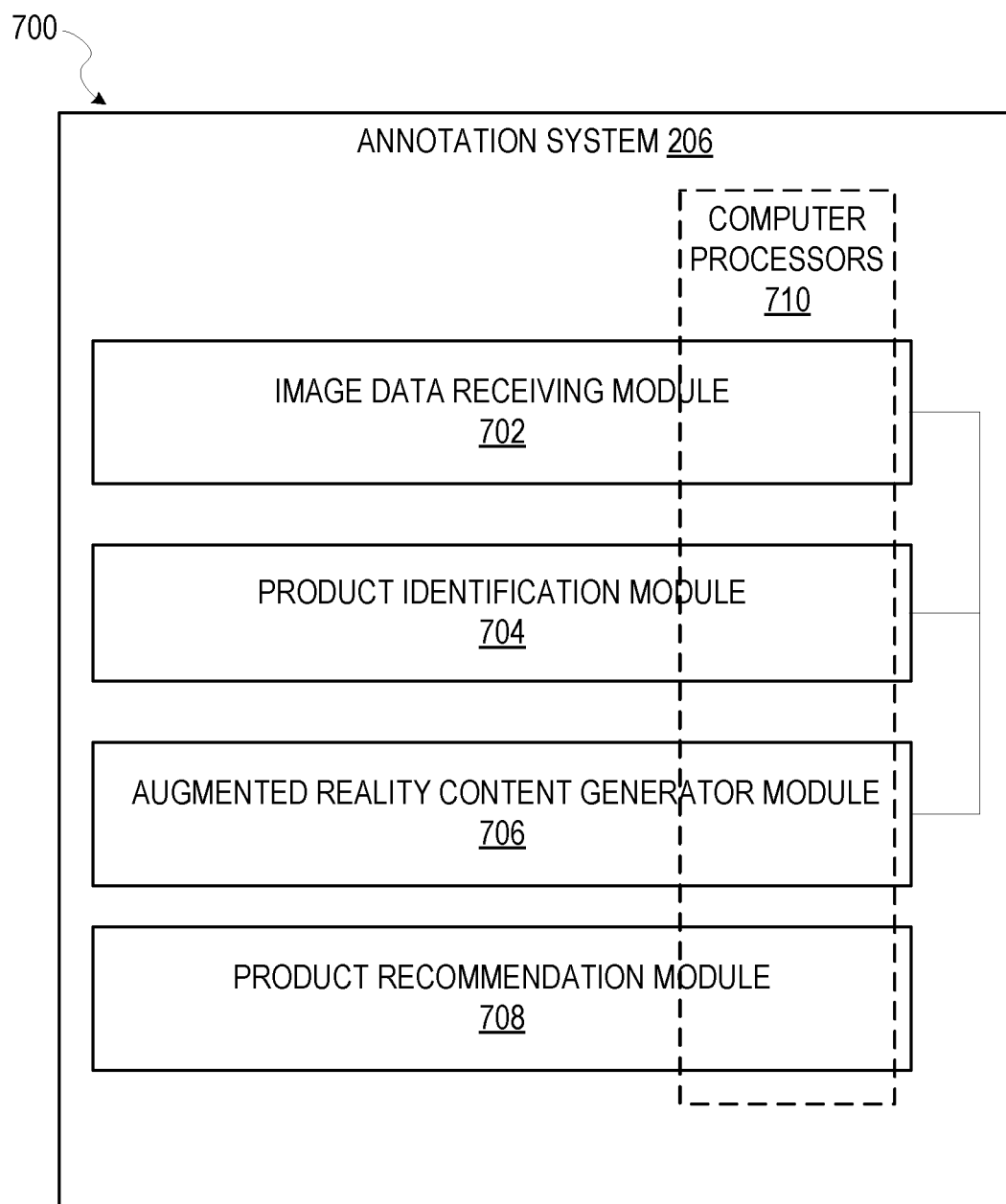
FIG. 7 is a block diagram illustrating various modules of an annotation system, according to certain example embodiments.

FIG. 7 is a block diagram 700 illustrating various modules of an annotation system 206, according to certain example embodiments. The annotation system 206 is shown as including an image data receiving module 702, a product identification module 704, a augmented reality content generator module 706, and a product recommendation module 708. The various modules of the annotation system 206 are configured to communicate with each other (e.g., via a bus, shared memory, or a switch). Any one or more of these modules may be implemented using one or more computer processors 710 (e.g., by configuring such one or more computer processors to perform functions described for that module) and hence may include one or more of the computer processors 710 (e.g., a set of processors provided by the client device 102).

Any one or more of the modules described may be implemented using hardware alone (e.g., one or more of the computer processors 710 of a machine (e.g., machine 2600) or a combination of hardware and software. For example, any described module of the annotation system 206 may physically include an arrangement of one or more of the computer processors 710 (e.g., a subset of or among the one or more computer processors of the machine (e.g., machine 2600) configured to perform the operations described herein for that module. As another example, any module of the annotation system 206 may include software, hardware, or both, that configure an arrangement of one or more computer processors 710 (e.g., among the one or more computer processors of the machine (e.g., machine 2600) to perform the operations described herein for that module. Accordingly, different modules of the annotation system 206 may include and configure different arrangements of such computer processors 710 or a single arrangement of such computer processors 710 at different points in time. Moreover, any two or more modules of the annotation system 206 may be combined into a single module, and the functions described herein for a single module may be subdivided among multiple modules. Furthermore, according to various example embodiments, modules described herein as being implemented within a single machine, database, or device may be distributed across multiple machines, databases, or devices.

The image data receiving module 702 receives images captured by a client device 102. For example, an image is a photograph captured by an optical sensor (e.g., camera) of the client device 102. An image includes one or more real-world features, such as a user's face, or a physical object(s) detected in the image. In some embodiments, an image includes metadata describing the image.

The product identification module 704 utilizes different object detection processes to detect objects in the image, such as a physical item corresponding to a product that a user wants to extract product metadata from, or a physical indicator of identification (e.g., barcode) corresponding to the physical item. In an example, imaging processing algorithms and recognition techniques may be used to detect objects of the image. For example, optical character recognition (OCR) can be used as a primary image analysis technique or to enhance other processes. Features (e.g., shape, size, color and text) of the image can be extracted. In some embodiments, image processing processes may include sub-processes such as, for example, thresholding (converting a grayscale image to black and white, or using separation based on a grayscale value), segmentation, blob extraction, pattern recognition, barcode and data matrix code reading, gauging (measuring object dimensions), positioning, edge detection, color analysis, filtering (e.g. morphological filtering) and template matching (finding, matching, or counting specific patterns).

Further, the product identification module 704, in an example embodiment, utilizes a set of classifiers that classify an image received from a camera of a mobile computing device into one or more classes. In an embodiment, an example set of image classifier determines whether the image includes a physical identification indicator containing text, barcode pattern(s), or QR code pattern(s), and the like. In an embodiment, another example set of image classifiers performs object classification based on a library of 3D models or images (e.g., stored in database 120). Various techniques (e.g., OCR and other geometric recognition processes) may also be used as the image analysis technique to recognize one or more potential objects of the image (e.g., the physical item corresponding to the product, and the physical identification indicator of the physical item). Further, it is appreciated that the product identification module 704 may utilize machine learning models (e.g., prediction model to classify image data into a particular object classification or type) to perform object recognition.

The product identification module 704 can perform operations (e.g., a process) for extracting product metadata from a recognized object corresponding to a physical identification indicator of the physical item in the image, and determining additional product metadata for the physical item. Further, the product identification module 704 may receive additional product metadata from the product catalog system 124 as described herein.

The augmented reality content generator module 706 cause display of selectable graphical items that, in an embodiment, are presented in a carousel arrangement (e.g., a carousel interface). By way of example, the user can utilize various inputs to rotate the selectable graphical items onto and off of the display screen in manner corresponding to a carousel providing a cyclic view of the graphical items. The carousel arrangement allows multiple graphical items to occupy a particular graphical area on the display screen. In an example, respective AR experiences corresponding to different AR content generators can be organized into respective groups for including on the carousel arrangement thereby enabling rotating through AR content generators by group. Although a carousel interface is provided as an example, it is appreciated that other graphical interfaces may be utilized. For example, a set of augmented reality content generators can include graphical list, scroll list, scroll graphic, or another graphical interface that enables navigation through various graphical items for selection, and the like. As used herein a carousel interface refers to display of graphical items in an arrangement similar to a circular list, thereby enabling navigation, based on user inputs (e.g., touch or gestures), through the circular list to select or scroll through the graphical items. In an example, a set of graphical items may be presented on a horizontal (or vertical) line or axis where each graphical item is represented as a particular thumbnail image (or icon, avatar, and the like). At any one time, some of the graphical items in the carousel interface may be hidden. If the user wants to view the hidden graphical items, in an example, the user may provide a user input (e.g., touch, gesture, and the like) to scroll through the graphical items in a particular direction (e.g., left, right, up, or down, and the like). Afterward, a subsequent view of the carousel interface is displayed where an animation is provided or rendered to present one or more additional graphical items for inclusion on the interface, and where some of the previously presented graphical items may be hidden in this subsequent view. In an embodiment, in this manner the user can navigate through the set of graphical items back and forth in a circular fashion. Thus, it is appreciated that the carousel interface can optimize screen space by displaying only a subset of images from a set of graphical items in a cyclic view.

The augmented reality content generator module 706 utilizes different object or facial detection processes to detect objects or a face in the image. In an example, imaging processing algorithms and recognition techniques may be used to detect the user's face in the image. Based on the selected AR content generator, the augmented reality content generator module 706 can generate and render an AR experience based on the selected AR content generator from the carousel interface for display on a given client device (e.g., the client device 102). In an embodiment, information from the product identification module 704 (e.g., a product ID, and the like) is used by the augmented reality content generator module 706 to render such AR content.

The augmented reality content generator module 706 performs rendering of content for display by the messaging client application 104 based on data provided by at least one of the aforementioned modules. For example, the augmented reality content generator module 706 performs various operations based on algorithms or techniques that correspond to animations or providing visual or auditory effects, based on the product information, to the received image data, which is described further herein.

The augmented reality content generator module 706 performs rendering of the message for display by the messaging client application 104 based on data provided by at least one of the aforementioned modules. In an example, the augmented reality content generator module 706 utilizes a graphical processing pipeline to perform graphical operations to render the message for display. The augmented reality content generator module 706 implements, in an example, an extensible rendering engine which supports multiple image processing operations corresponding to respective media overlays.

In some implementations, the augmented reality content generator module 706 provide a graphics system that renders two-dimensional (2D) objects or objects from a three-dimensional (3D) world (real or imaginary) onto a 2D display screen. Such a graphics system (e.g., one included on the client device 102) includes a graphics processing unit (GPU) in some implementations for performing image processing operations and rendering graphical elements for display.

In an implementation, the GPU includes a logical graphical processing pipeline, which can receive a representation of a 2D or 3D scene and provide an output of a bitmap that represents a 2D image for display. Existing application programming interfaces (APIs) have implemented graphical pipeline models. Examples of such APIs include the Open Graphics Library (OPENGL) API and the METAL API. The graphical processing pipeline includes a number of stages to convert a group of vertices, textures, buffers, and state information into an image frame on the screen. In an implementation, one of the stages of the graphical processing pipeline is a shader, which may be utilized as part of a particular augmented reality content generator that is applied to an input frame (e.g., image or video). A shader can be implemented as code running on a specialized processing unit, also referred to as a shader unit or shader processor, usually executing several computing threads, programmed to generate appropriate levels of color or special effects to fragments being rendered. For example, a vertex shader processes attributes (position, texture coordinates, color, etc.) of a vertex, and a pixel shader processes attributes (texture values, color, z-depth and alpha value) of a pixel. In some instances, a pixel shader is referred to as a fragment shader.

It is to be appreciated that other types of shader processes may be provided. In an example, a particular sampling rate is utilized, within the graphical processing pipeline, for rendering an entire frame, or pixel shading is performed at a particular per-pixel rate. In this manner, a given client device (e.g., the client device 102) operates the graphical processing pipeline to convert information corresponding to objects into a bitmap that can be displayed by the electronic device.

Figure 8:
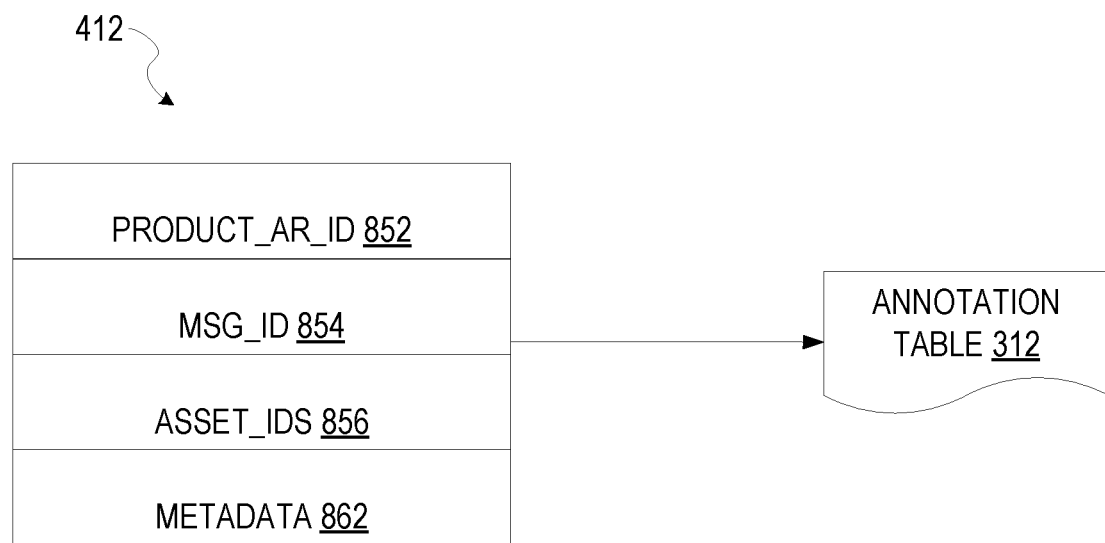
FIG. 8 is a schematic diagram illustrating a structure of the message annotations, as described in FIG. 4, including additional information corresponding to product metadata for a physical item (e.g., product), according to some embodiments.

FIG. 8 is a schematic diagram illustrating a structure of the message annotations 412, as described in FIG. 4, including additional information corresponding to an augmented reality experience for a product, according to some embodiments. In particular, the additional information corresponds to information in a message for presenting an AR experience for the.

In an embodiment, the content of a particular message 400 including the additional data shown in FIG. 8 is used to populate the message table 314 stored within the database 120 for a given message, which is then accessible by the product catalog system 124, or the messaging client application 104. As illustrated in an example embodiment, message annotations 412 includes the following components corresponding to data for a message:

A product augmented reality experience identifier 852: identifier of an augmented reality experience (e.g., augmented reality content generator, animation or effect, including an effect, LENSES, filter, image modifier, and the like) utilized in the message message identifier 854: identifier of the message asset identifiers 856: a set of identifiers for assets in the message. For example, respective asset identifiers can be included for a number of assets that is determined by the particular AR content generator. In an embodiment, such assets are created by the AR content generator on the sender side, uploaded to the messaging server application 114, and utilized by the AR content generator on the receiver side in order to recreate the message.

metadata 862 corresponding to additional metadata

Figure 9:
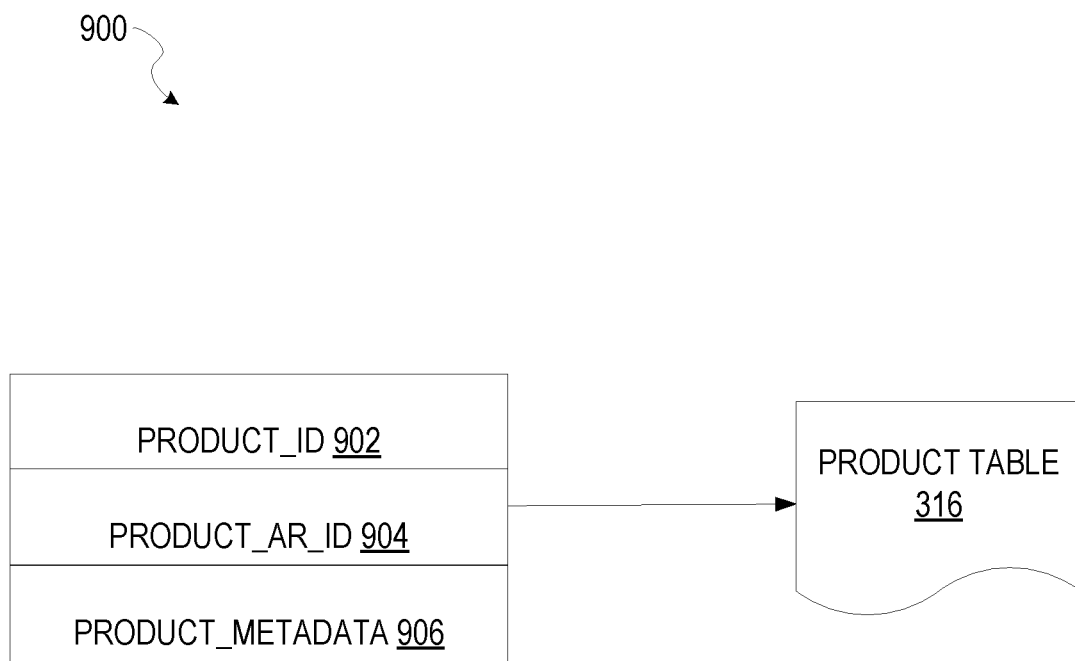
FIG. 9 is a schematic diagram illustrating a structure of product metadata stored in the product table, as described in FIG. 3, corresponding to information for a physical item (e.g., product), according to some embodiments.

FIG. 9 is a schematic diagram illustrating a structure of product metadata 900 stored in the product table 316, as described in FIG. 3, corresponding to information for a physical item (e.g., product), according to some embodiments.

In an embodiment, the data shown in FIG. 9 is used to populate the product table 316 stored within the database 120, which is then accessible by the product catalog system 124, or the messaging client application 104. As illustrated in an example embodiment, the product metadata 900 includes the following components:

A product identifier 902: identifier of a product (e.g., model number, part number, a unique serial number, etc.) extracted from the physical identification identifier from the image data A product augmented reality experience identifier 904: identifier of an augmented reality experience (e.g., augmented reality content generator, animation or effect, including an effect, LENSES, filter, image modifier, and the like) utilized in the message, which can be utilized to compare against the product augmented reality experience identifier 852 discussed in FIG. 8 product metadata 906: information related to the product corresponding to the product identifier 902

Embodiments of the subject technology provides brands (e.g., corresponding to respective companies or entities that make or provide physical products) with a consistent user interface and user experience framework for AR content generators that are constructed, at least in part, based on product information from a product catalog (e.g., provided by product catalog system 124 or product catalog service system 602). More specifically, a product card can be generated which refers to a combination of AR content with product information that are provided for display to a user in an appropriate interface (e.g., graphical interface or as part of an AR experience while using a mobile device or an eyewear device such as an AR headset device). As discussed before in FIG. 8 and FIG. 9, product information can be associated with a particular AR experience (e.g., AR content generator and the like).

Figure 10:
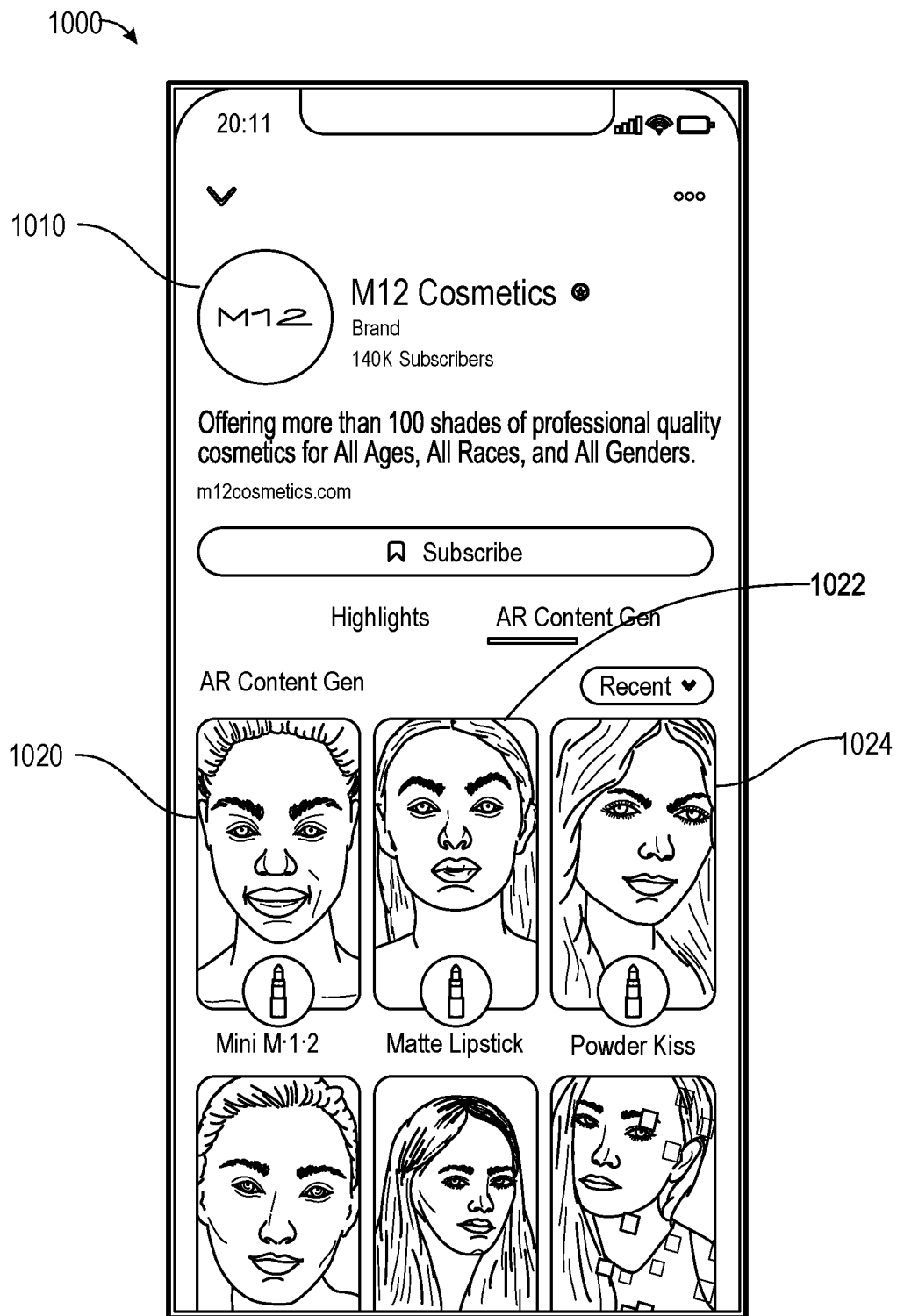
FIG. 10 illustrates example interface in accordance with various embodiments.

FIG. 10 illustrates example interface in accordance with various embodiments. The example interface of FIG. 10 can be provided for display on a client device (e.g., the client device), such as through an interface(s) of the messaging client application 104.

The client device 102 may have at least one camera. Each camera may be, for example, a charge-coupled device (CCD), an active pixel sensor in complementary metal-oxide-semiconductor (CMOS) or N-type metal-oxide-semiconductor (NMOS), an infrared or ultrasonic image sensor, or an image sensor utilizing other type of image capturing technologies. In an example, the user can position the client device 102 such that one or more physical objects, including a physical item (e.g., a beauty product box), are within a field of view of at least one camera of the client device 102. The at least one camera can capture an image, such that a representation of the physical item with a representation of a physical identification indicator are displayed on a display screen of the client device 102. In some embodiments, the at least one camera captures video, providing a "live" view of the captured video information. The image or a frame of the video can be analyzed, such as by analyzing on the client device 102 or sending across a network (e.g., the network 106) to a server or service (e.g., the messaging server system 108 or the image processing system 116) for analyzing image data.

The client device 102, by using the product identification module 704, can extract product metadata, such as a product ID, based on the representation of the physical identification indicator 1002. The client device 102 then sends the extracted product metadata to the product catalog system 124 to receive additional product metadata. Based at least in part on the received manufacturer verification metadata, the client device 102 can send a request to the product catalog service system 602 for obtaining the additional product metadata, among other types of information that may be included as discussed herein.

In embodiments, the product recommendation module 708 can select a set of AR experiences (e.g., AR content generators, and the like) related to items or products based on user profile information, user activity, ranking signals, and other signals, for display by the client device 102. As also discussed further herein, AR experiences can be selected based on a domain or other parameters associated with a given AR content generator.

In the example of FIG. 10, a product corresponding to a particular band may have been scanned which causes an interface to be provided as discussed below. In another example, the interface described below is provided when accessing a social network, or some other server where a user can navigate and explore for various products or content, including AR content.

In the example illustrated in FIG. 10, an interface 1000 is provided showing information based at least in part on the product metadata described above, which may be received and displayed by the augmented reality content generator module 706 on the client device 102.

As shown, profile information 1010 corresponding to a given brand (e.g., a cosmetics manufacturer) is shown for display in interface 1000. Similar to viewing a profile in a social network, interface 1000 can provide content related to the brand, and in this example provides AR experiences for different products associated with the brand. In this example, a set of product cards including product card 1020, product card 1022, and product card 1024 are included in interface 1000 below profile information 1010. Each product card, in an embodiment, can have a size up to a predetermined dimension (e.g., fixed maximum width or fixed maximum height, and the like) when included in interface 1000. Moreover, each product card provides an AR experience (e.g., AR content generator) for a particular product (e.g., corresponding to a product SKU or other identifier). In an embodiment, each product card in interface 1000 are randomly selected in order to populate interface 1000. In an embodiment, each product card in interface 1000 is selected based on a ranking of each of the product cards (e.g., where a score is assigned to each product card).

Additional product cards are partly shown below product card 1020, product card 1022, and product card 1024, and it is appreciated that any number of product cards can provided in response to an appropriate input such as a scrolling gesture (e.g., downward or upward swipe) or similar interaction with interface 1000. As also shown, each product card can include corresponding labels or textual information for describing a product(s) associated with the product card.

Figure 11:
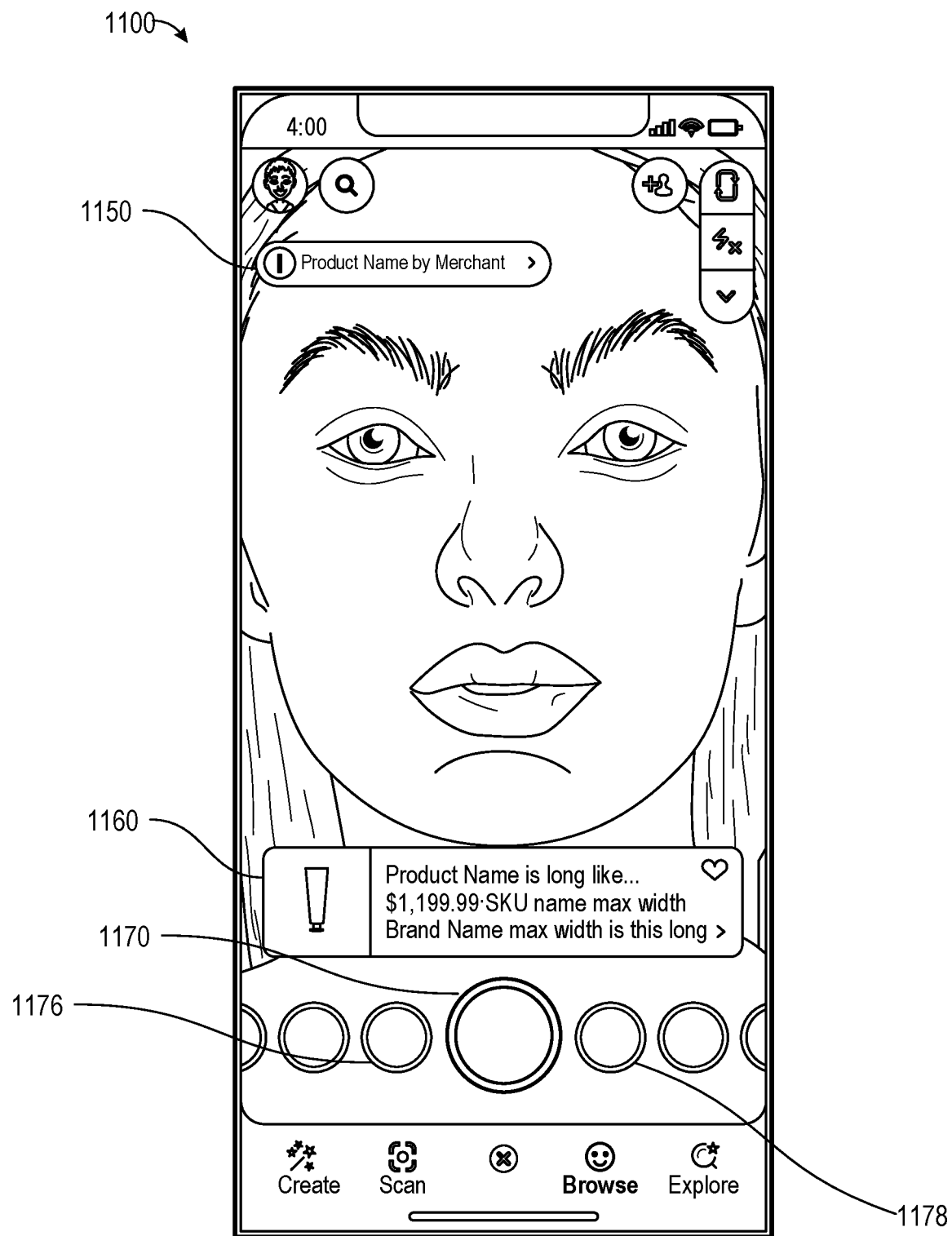
FIG. 11 illustrates example interface in accordance with various embodiments.

In embodiments, a given product card can include various functionality the enables the subject system to provide:
- a SKU selector for a product(s)
- a call to action button for which different product URLs can be linked
- a display of relevant purchasing information (e.g., price, SKU name, merchant, and the like)
- a way to favorite, save, or bookmark individual products shown in the AR content generator or experience FIG. 11 illustrates example interface in accordance with various embodiments. The example interface of FIG. 11 can be provided for display on a client device (e.g., the client device), such as through an interface(s) of the messaging client application 104.

In this example, one of the product cards (e.g., product card 1022) in FIG. 10 has been selected. As shown, product information 1160 is included (e.g., product description, price, manufacturer, vendor, selection graphical item to view additional information, and the like). As further shown, additional information 1150 related to the product (e.g., a description or product name) can be included in the interface 1100. To revert to the interface 1000, an input can be received anywhere outside of additional information 1150 or product information 1160.

A set of selectable graphical items, including a selectable graphical item 1170, are displayed which correspond to respective product cards associated with different beauty products. In an embodiment, the set of selectable graphical items are selected and presented in a carousel interface in the interface 1100 based on the information from a product catalog (e.g., associated with a particular brand as mentioned above). A selectable graphical item 1170, corresponding to a particular product card (e.g., product card 1022), is illustrated as being selected by the user in this example. A different product card can be selected from the set of selectable graphical items such as selectable graphical item 1176 or selectable graphical item 1178 from the carousel interface using an appropriate input (e.g., touch input, tap, and the like). When a different product card is selected, the corresponding selectable graphical item can be positioned in the center of the carousel interface which causes the other selectable graphical items to shift either in a left or right direction accordingly.

Figure 12:
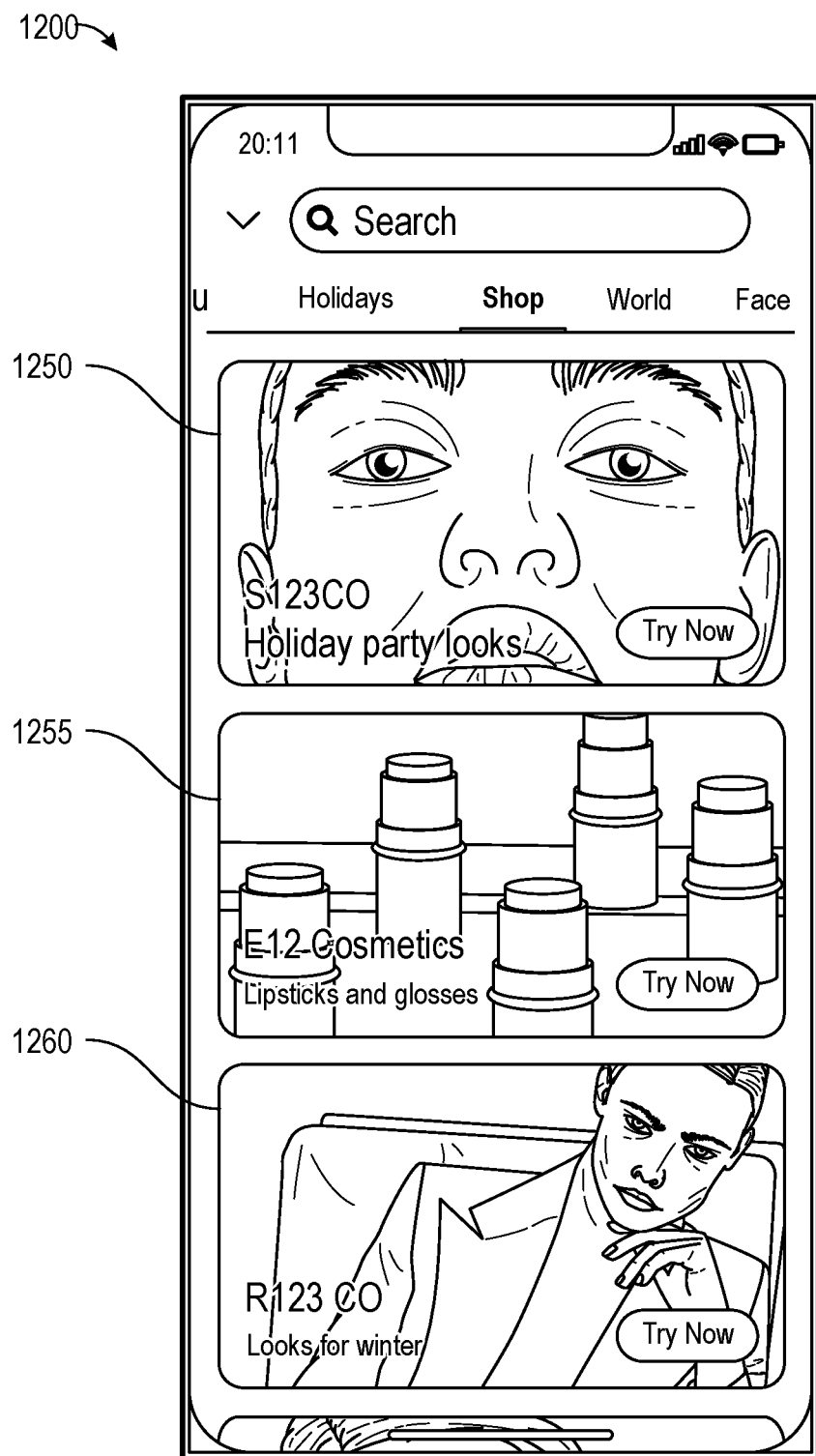
FIG. 12 illustrates example interface in accordance with various embodiments.

FIG. 12 illustrates example interface in accordance with various embodiments. The example interface of FIG. 12 can be provided for display on a client device (e.g., the client device), such as through an interface(s) of the messaging client application 104.

In this example, a set of product cards (e.g., product card 1250, product card 1255, and product card 1260) are shown in a columnar arrangement in response to selecting product information 1160 or additional information 1150 discussed in FIG. 11. In an embodiment, the set of product cards are enabled to be scrolled through which causes additional product cards to be included in interface 1200 (also causing product card 1250, product card 1255, and product card 1260 to disappear from interface 1200). Each product card in interface 1200 is represented by a selectable graphical item, each of which can be selected (e.g., touch input, or hovering over with a cursor or finger, and the like) thereby causing additional information to be displayed for the selected product card. As also shown, each product card in FIG. 12 includes a selectable graphical item (e.g., "Try Now" button), which when selected, causes a corresponding AR content generator of the product card to be displayed on the display of the client device (e.g., similar to the description in FIG. 11). The AR content generator can then render for display AR content upon a user's facial features based on a corresponding product (e.g., a beauty product such as lip stick, makeup, and the like) of the product card.

In embodiments, the subject technology can provide an API (application programming interface) that will allow users to see augmented reality experiences (e.g., AR content generators, and the like) related to a specific product when the user is browsing a product detail page (PDP). As discussed further herein, the subject API can enable creation of dynamic AR experiences (e.g., dynamic AR content generators) which provide several advantages. In an embodiment, this requires efficiently looking up (e.g., searching a database) the augmented reality experiences (e.g., AR content generators, and the like) that reference an item/product which is done on a massive scale (e.g., high network traffic, number of requests, number of products, and the like).

As referred to herein, an "item" is stored by a product catalog service (e.g., see FIG. 6 describing a product catalog system). In embodiments, a product catalogs contain items, and are displayed in online advertisements. Items can have specific attributes. For example, hotels have neighborhoods, products have sizes, autos have VIN numbers. As referred to herein, an item set can refer to a collection of products that match a filter provided by an advertiser(s), and in some embodiments, online advertisements can refers a particular item set(s).

In some embodiments, static augmented reality experiences (e.g., AR content generators, and the like), e.g., 3D assets are "baked in" (e.g., stored within) during augmented reality content generator creation, and the items the augmented reality content generator can include can also be pre-defined during the augmented reality content generator creation, which 1) limits how many items/assets a augmented reality content generator can have, subject to a predetermined size limit and 2) thereby increases the difficulty to create an augmented reality content generator at scale as for each "set" of the items, the user can be required to create a new augmented reality content generator.

Figure 13:
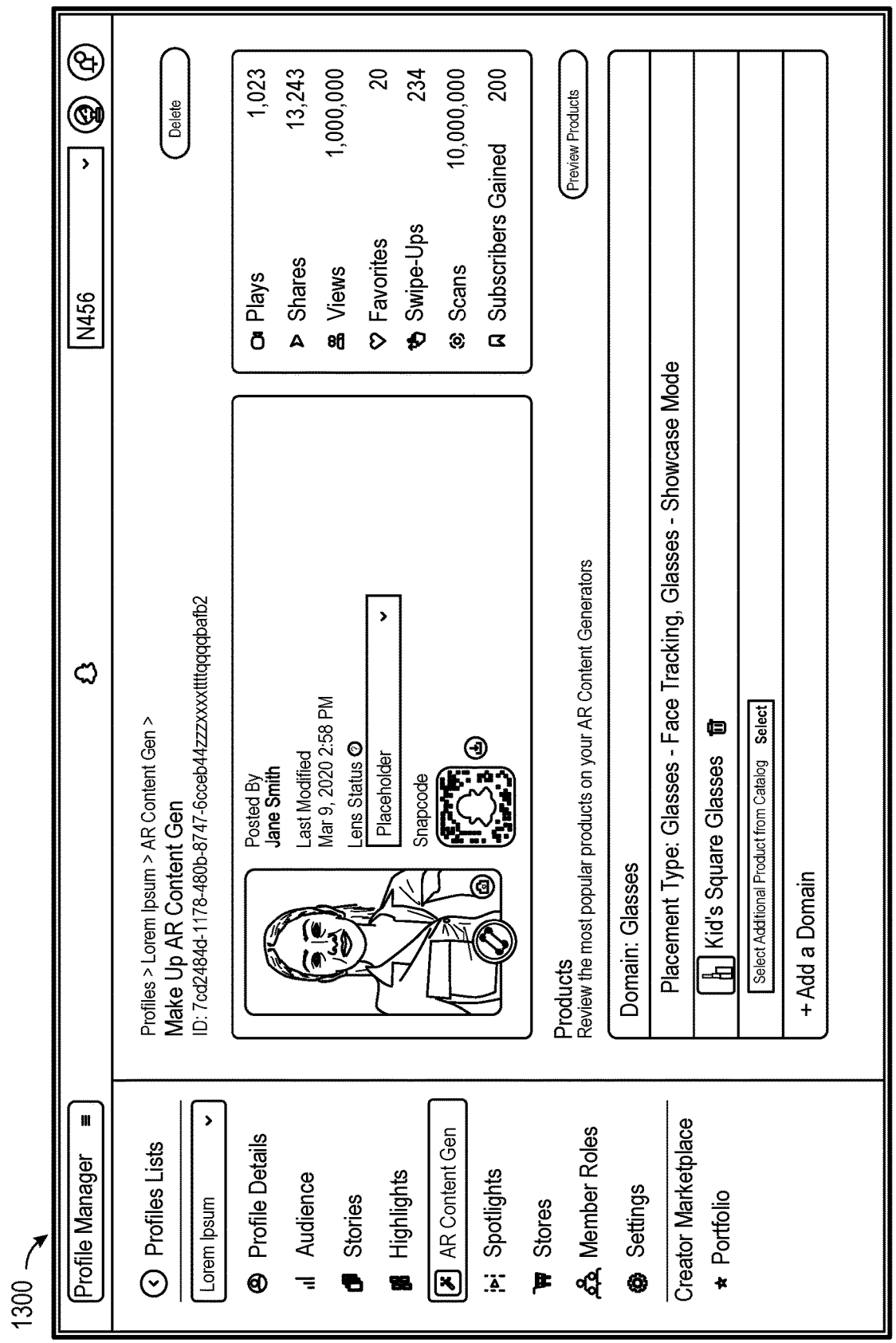
FIG. 13 illustrates an example interface 1300 of an application for developing an augmented reality content generator (e.g., for providing an AR experience for a given product(s)) based on a user profile.

FIG. 13 illustrates an example interface 1300 of an application for developing an augmented reality content generator (e.g., for providing an AR experience for a given product(s)) based on a user profile.

In an embodiment, the application may be a program that enables editing of a given augmented reality content generated, including modification of various properties and interactive characteristics, including AR content, of a given augmented reality content generator. Further, the application may enable editing of product metadata (e.g., a product ID, and the like) for a product associated with the augmented reality content generator.

As illustrated in the interface 1300, various graphical elements are included to modify and configure various aspects of an AR content generator. Information related to the AR content generator is shown in interface 1300 including a name of the AR content generators along with its identifier. As further shown, information related to a user profile is shown. Moreover, statistical information related to the user profile (e.g., plays, shares, views, favorites, swipe-ups, scans subscribers, and the like) is provided in interface 1300. As also shown, information related to a product is provided in interface 1300 (e.g., domain, placement, product name).

As illustrated in the interface 1300, a graphical element is included to provide an option for indicating that the user profile corresponds to an augmented reality content generator (e.g., that provides an AR experience) for a product (e.g., "shopping" AR experience). In an example, the interface 1300 is displayed when managing a user profile in an application or tool for developing augmented reality experiences.

In embodiments, for dynamic shopping augmented reality experiences (e.g., AR content generators, and the like), the 3D assets are stored in a corresponding product catalog (e.g., see FIG. 6). The augmented reality content generator functions as a "container", where the brand may define the augmented reality content generator's AR product type (e.g., "Shoes") and custom fields (e.g., "Ultra Boots") as filters to determine which products in the product catalog that are eligible to be shown in this augmented reality content generator (e.g., a set of these eligible products is referred to as the "augmented reality content generator item set"). At runtime, these assets will be dynamically loaded into the client (e.g., client device 102), and can undergo ranking or (random) selection (e.g., by a product recommendation service such as product recommendation module 708) to determine which products to provide for display in an interface.

Based on how items are specified inside a dynamic AR content generator, there can be two sub-categories for a shopping related AR content generator:
  dynamic fixed: fixed membership is controlled by a finite list of item identifiers that are allowed to be in an item set. Only these items will be allowed in the item set. In the product catalog system, the item set membership used by dynamic fixed shopping AR content generators is called a fixed membership.
  dynamic flexible: search filters are supplied by the creator of the item set. If an item matches the filter then it will be placed into a item set. The supported filter attributes are dependent on the type of catalog the item set is associated with. In the product catalog system, the item set membership used by dynamic flexible shopping AR content generators is called a dynamic membership.

Figure 14:
FIG. 14 illustrates an example interface 1400 of an application for developing an augmented reality content generator (e.g., for providing an AR experience for a given product(s)) based on a user profile.

FIG. 14 illustrates an example interface 1400 of an application for developing an augmented reality content generator (e.g., for providing an AR experience for a given product(s)) based on a user profile.

In some examples, a domain defines how products are grouped for selecting and presentation to a client. Domains can be understood as multi-selection elements from a UI perspective. AR content generators can have one or more domains e.g., if an AR content generator wants to display products in 2 areas (lip, eyeshadow) these would account for 2 domains.

As shown in interface 1400, a set of graphical element are provided to modify and edit products that are selected for a domain(s) associated with the AR content generator. In this example, options are provided to specify a sales rank that determines on selection criteria for a product. Other graphical items provide the ability to add a custom field and add an additional domain to the AR content generator.

Figure 15:
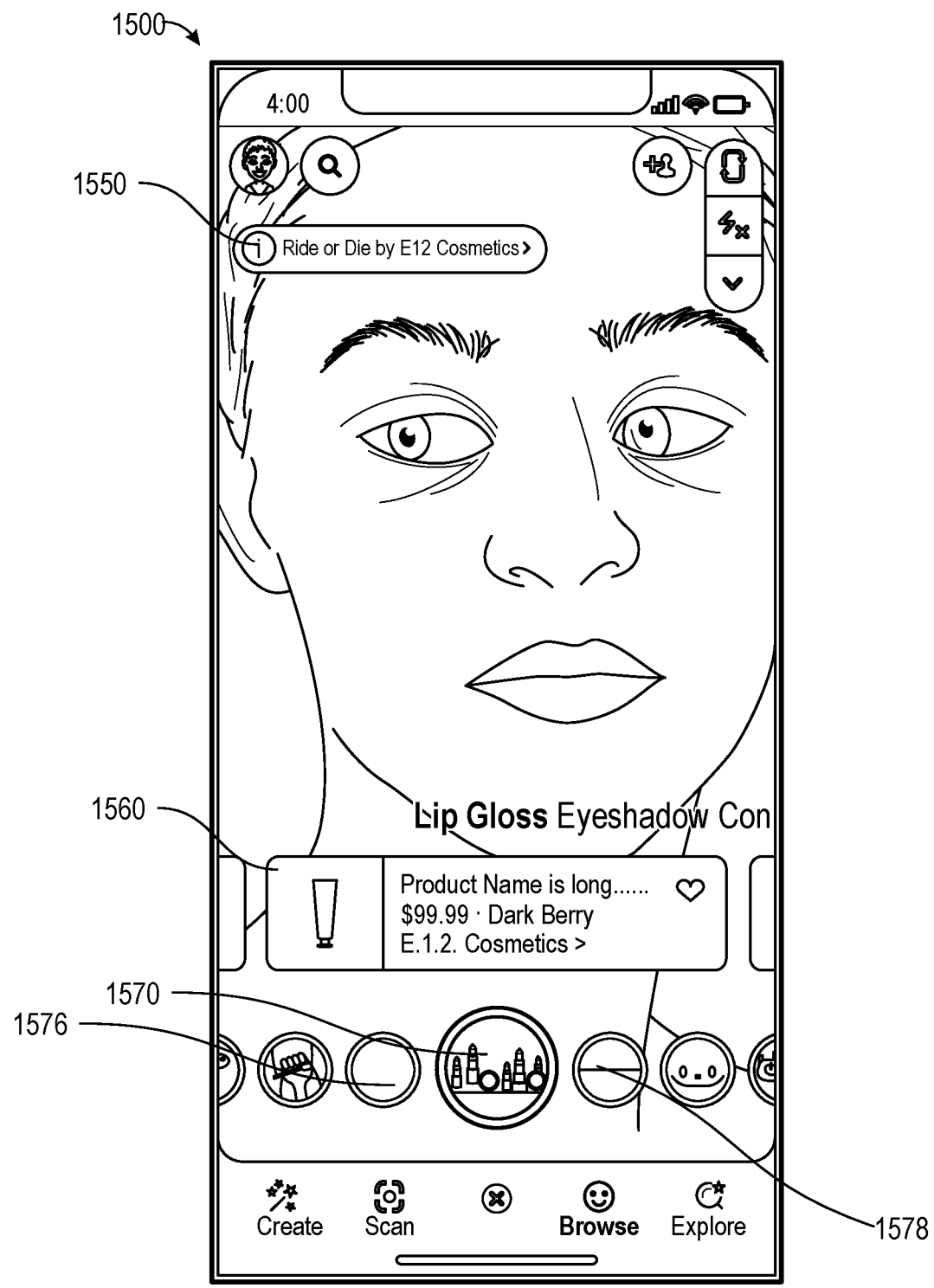
FIG. 15 illustrates example interface in accordance with various embodiments.

FIG. 15 illustrates an example interface in accordance with various embodiments. The example interface of FIG. 15 can be provided for display on a client device (e.g., the client device), such as through an interface(s) of the messaging client application 104.

In this example, product information 1560 is included (e.g., product description, price, manufacturer, vendor, selection graphical item to view additional information, and the like). As further shown, additional information 1550 related to the product (e.g., a description or product name) can be included in the interface 1500.

A set of selectable graphical items, including a selectable graphical item 1570, are displayed which correspond to respective product cards associated with different beauty products. In this example, the product cards are associated with respective AR content generators that have been selected from a product catalog (e.g., provided by a product catalog system discussed in FIG. 6) based on a domain or other selection parameters as discussed before. In an embodiment, the set of selectable graphical items are selected in this manner and presented in a carousel interface in the interface 1500. A selectable graphical item 1570, corresponding to a particular product card and AR content generator, is illustrated as being selected by the user in this example. A different product card can be selected from the set of selectable graphical items such as selectable graphical item 1576 or selectable graphical item 1578 from the carousel interface using an appropriate input (e.g., touch input, tap, and the like). When a different product card is selected, the corresponding AR content generator can be provided for display with its own associated information, AR content, AR effects, and the like.

In embodiments, the subject technology provides an API and SDK (software development kit) to enable applications (e.g., e-commerce apps that involve product catalogs and associated items) to provide AR shopping experiences.

More specifically, the subject technology provides an extension, in the form of an API (e.g., "Shopping Camera Extension API" or "Camera Extension API" or "extension API"), to an existing camera API, which can be understood as enabling (external or third party) applications to utilize and provide AR experiences, including basic camera functionality, along with providing management and analytics related to such AR experiences. In an implementation, the functionality provided by the extension API does not overlap with the existing camera API as discussed further herein, and the extension API works in conjunction with the camera API to provide shopping related AR content generators and AR experiences in a manner to facilitate (external) application to more easily provide such AR content to users that are interested, for example, in a given brand's products (e.g., items provided in a product catalog through a product catalog service as discussed in FIG. 6).

In embodiments, the extension API processes product information (e.g., SKU) and launches a camera and provides a graphical interface that applies a given AR content generator in an automated manner without extensive development or configuration by an application to facilitate displaying a product or item (e.g., from a product catalog) as AR content for viewing within the application. In an embodiment, this can be provided as a selectable graphical item (e.g., "Try with AR" button or "Try Now" button and the like) in the graphical interface.

Figure 16:
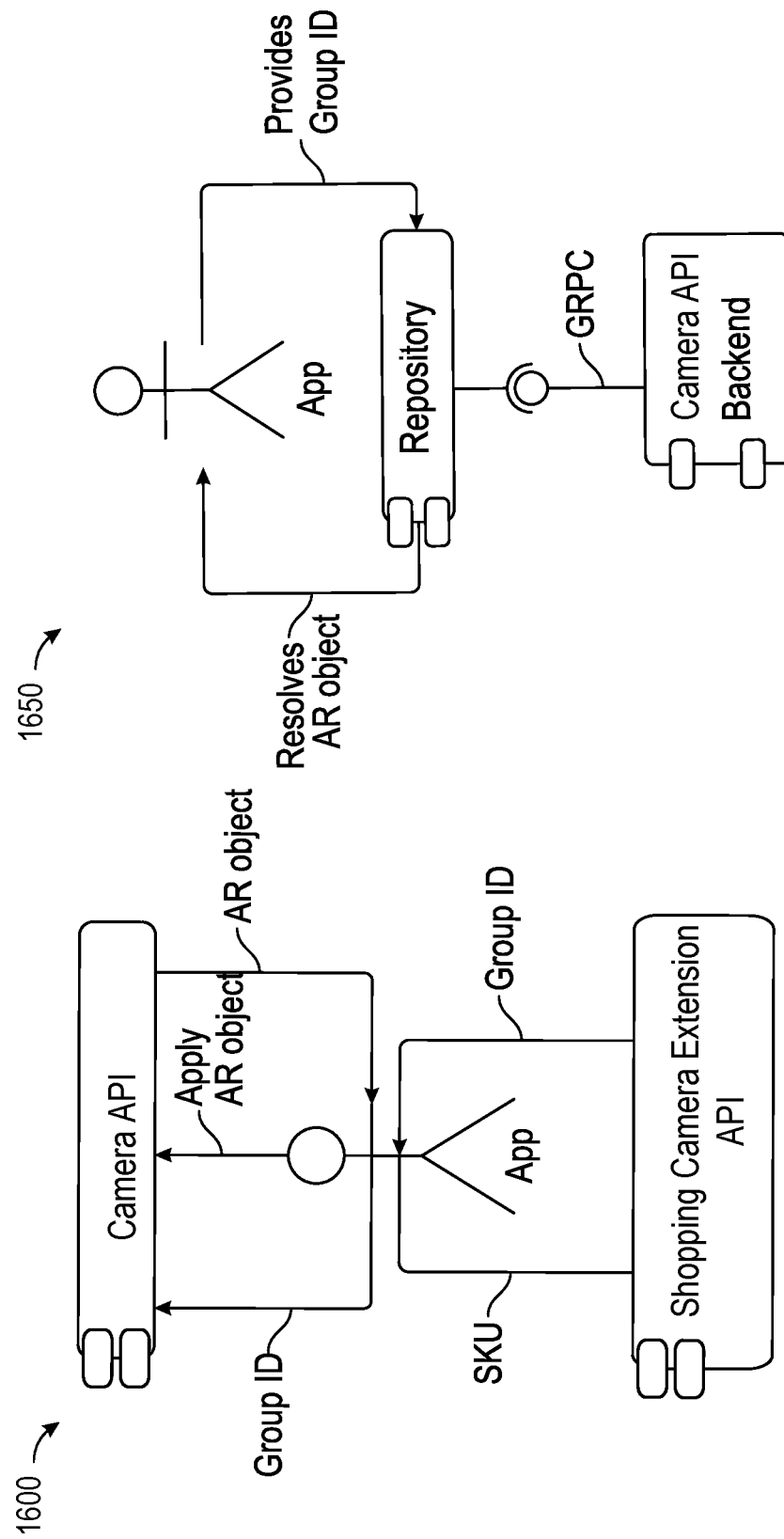
FIG. 16 conceptually illustrates an example component and data flow diagram of applying an augmented reality (AR) content generator and metadata delivery for an AR content generator, in accordance with some embodiments.

FIG. 16 conceptually illustrates an example component and data flow diagram of applying an augmented reality (AR) content generator and metadata delivery for an AR content generator, in accordance with some embodiments.

In data flow 1600, in order to apply an AR content generator using the camera API, an object called AR content generator (or "AR object" as discussed in connection with the following figures) is utilized. In embodiments, the AR content generator object can comprise a simple descriptor containing all information necessary for the camera API to perform a set of operations (e.g., fetch content, assets, process metadata, and the like) that eventually results in AR content being rendered for display on a given client device (e.g., using at least in part the camera API).

In data flow 1650, a camera API repository is responsible for metadata delivery. The camera API repository provides the ability to retrieve an AR object by its identifier and group identifier. In embodiments, the camera API repository can be implemented as a dedicated service for camera API partners (e.g., applications) to deliver metadata for AR content generators. In an embodiment, AR objects can be stored in a database (e.g., database 120).

Figure 17:
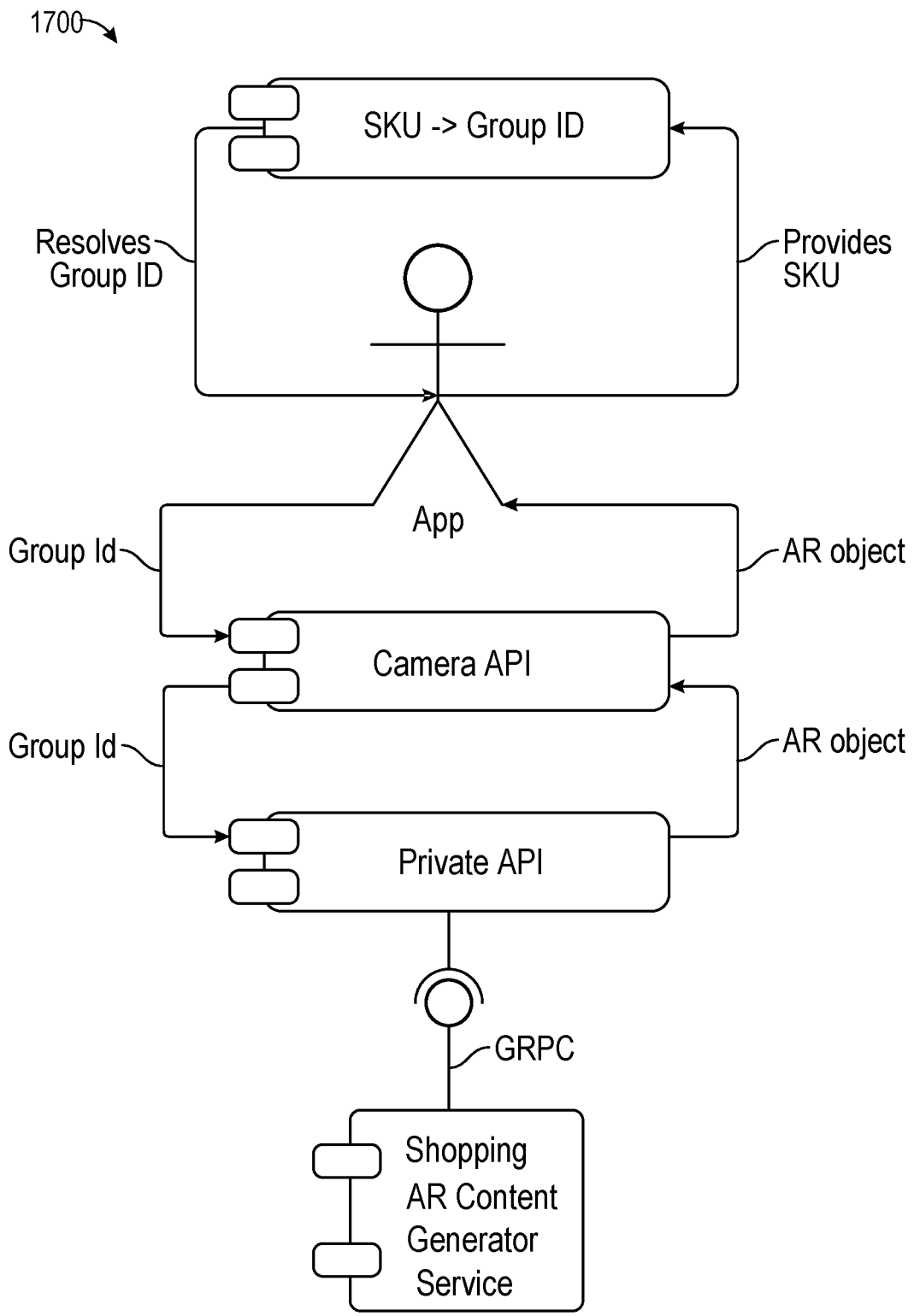
FIG. 17 conceptually illustrates an example component and data flow diagram of resolving a group identifier for a set of AR content generators, in accordance with some embodiments.

FIG. 17 conceptually illustrates an example component and data flow diagram of resolving a group identifier for a set of AR content generators, in accordance with some embodiments.

In data flow 1700, the extension API also utilizes the functionality provided by the camera API repository. In an implementation, the camera API repository accepts (e.g., receives an input or as a parameter) a group identifier that is a unique identifier that represents a set of AR content generators. Such a group identifier can be resolved to determine shopping AR content generators which is then provided (e.g., displayed in an interface) to a user(s). As shown, a product identifier, such as a SKU, is provided to an application, which proceeds to determine a group ID corresponding to the SKU using the camera API repository. In an implementation, the camera API repository stores information associating SKUs to group IDs (e.g., by utilizing a lookup table (or database table, or registry) which includes information that associates a set of SKUs to their respective group ID(s)).

In embodiments, a repository for the extension API is based on a service that provides AR content generator metadata for a given SKU, and such a service can inject such metadata to provide to the camera API, which then utilizes a secondary API ("Private API") to store the group ID to a shopping AR content generator service (e.g., to associate with one or more AR objects). In a subsequent request, the application then receives a special identifier associated with the SKU, which determines the group ID corresponding to the SKU by querying the repository of the extension API. In turn, the camera API provides the group ID to the private API, which communicates with the shopping AR content generator service that retrieves the AR content generator(s) based on the group ID, and to enable the AR content generator to be accessible in the camera API repository. As shown, the AR object is provided from the private API to the camera API, which then sends the AR object to the application for display. In an implementation, the secondary API is a private API (as shown) that is only accessible by the camera API or the extension API (e.g., not publicly accessible). Thus, in order to access the shopping AR content generator service shown in FIG. 17, camera API sends request(s) to the private API (e.g., with the group ID), which in return communicates with the shopping AR content generator service and returns metadata corresponding to the group ID (e.g., the AR content generator(s) associated with the group ID). The private API therefore can provide an additional (abstraction) layer to facilitate greater interoperability between the camera API and the shopping AR content generator service, while also improving security as invalid requests are not processed by the private API or vice versa (e.g., the private API does not accept invalid request(s) from the shopping AR content generator service).

Figure 18:
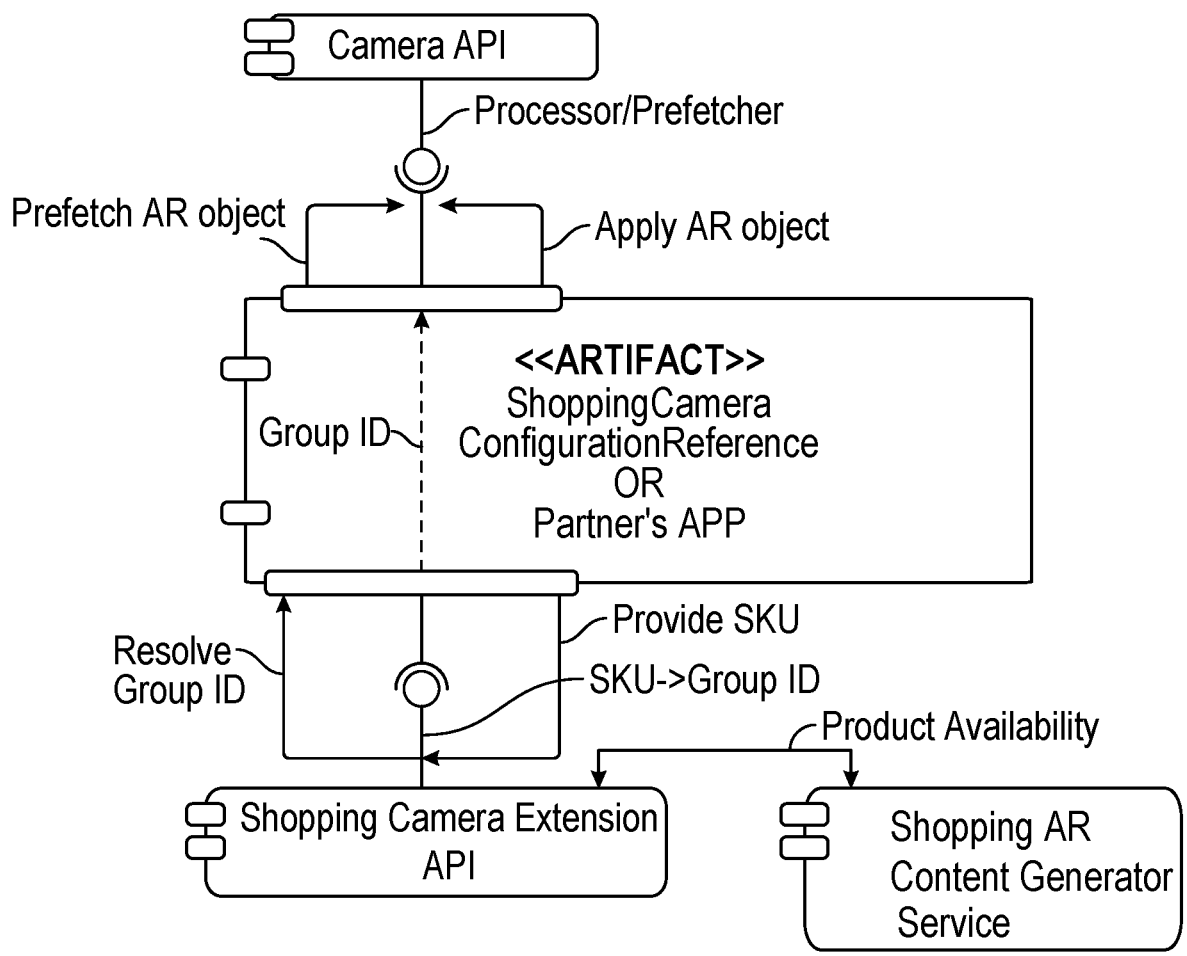
FIG. 18 conceptually illustrates an example component and data flow diagram of delivering product metadata, in accordance with some embodiments.

FIG. 18 conceptually illustrates an example component and data flow diagram of delivering product metadata, in accordance with some embodiments.

In data flow 1800, the extension API can query a shopping AR content generator service to determine product availability, which results in providing related metadata (e.g., SKU) that can be utilized to query for a group ID corresponding to a set of AR content generators (e.g., either from camera API repository or extension API repository as described before in at least FIG. 17). In an implementation, a shopping camera configuration reference artifact (e.g., type of data object) is provided that aggregates camera setup, shopping UI implementation, authorization, carousel UI and basic business logic for an AR shopping experience. Moreover, the shopping camera configuration reference artifact will declare a virtual "try on" button (e.g., selectable graphical item) to open the camera with shopping AR content generators and related products.

Figure 19:
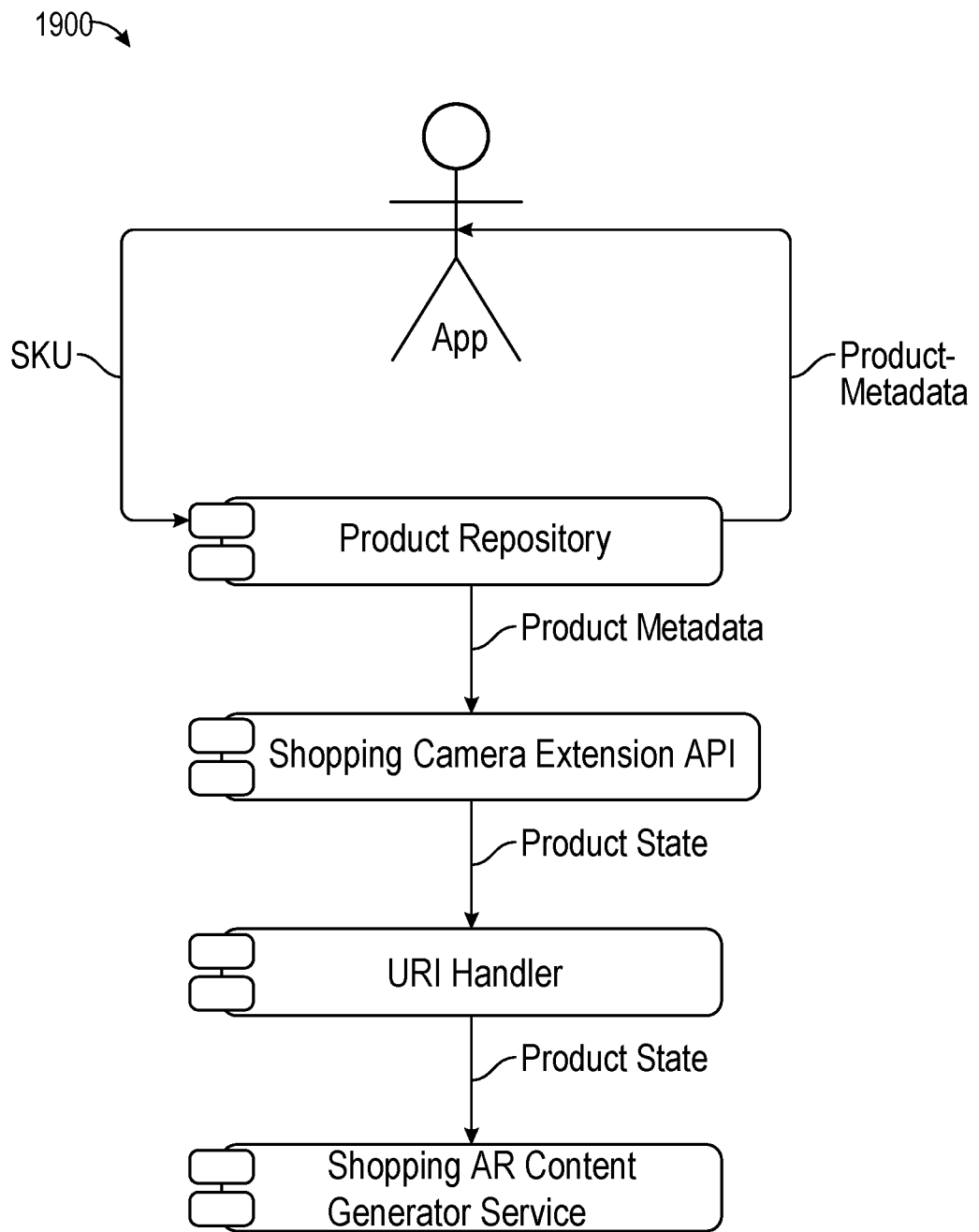
FIG. 19 conceptually illustrates an example component and data flow diagram of applying an augmented reality content generator, in accordance with some embodiments.

FIG. 19 conceptually illustrates an example component and data flow diagram of applying an augmented reality content generator, in accordance with some embodiments.

In data flow 1900, to draw (e.g., render for display) a set of product cards on a partner's application and provide product options to URI handler (discussed further herein), the subject technology delivers product metadata from a backend to the extension API. In an embodiment, this is accomplished by providing a product repository. In an embodiment, such a product repository can be implemented in a similar manner to product catalog system 124 (or product catalog service system 602) as described before and may provide one or more databases or tables (e.g., data structures 300 stored in the database 120 of the messaging server system 108).

Figure 20:
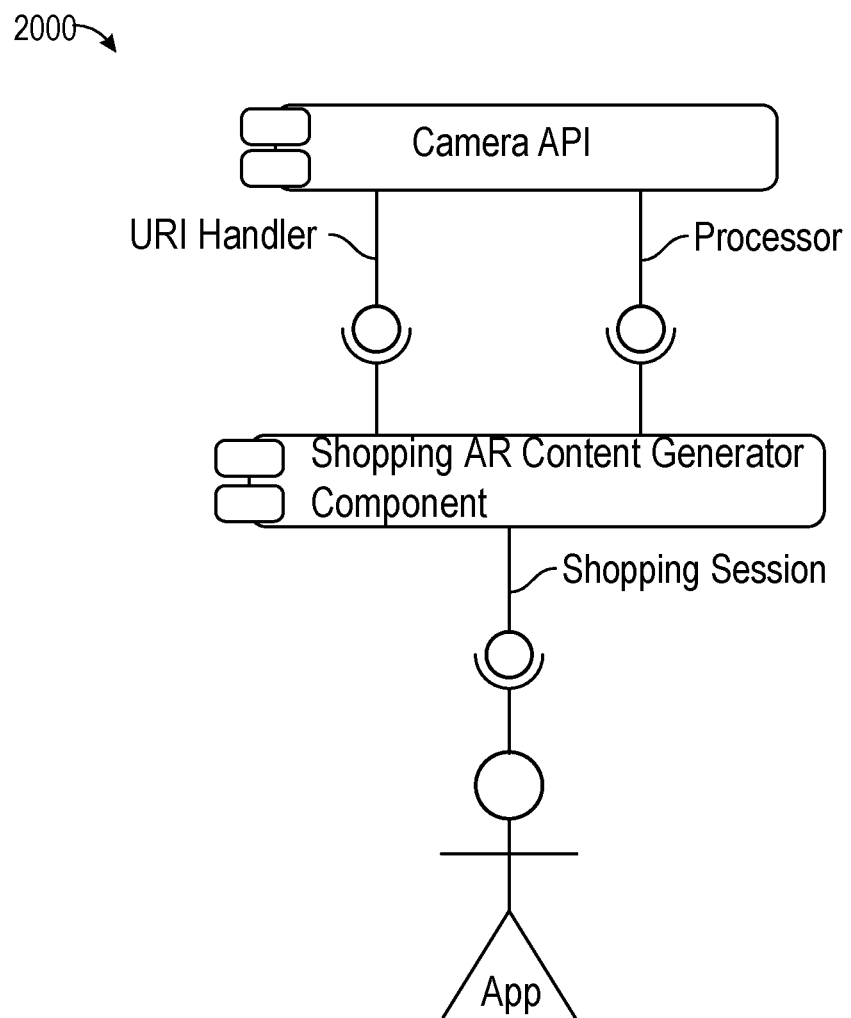
FIG. 20 conceptually illustrates an example component and data flow diagram of applying an augmented reality content generator, in accordance with some embodiments.

FIG. 20 conceptually illustrates an example component and data flow diagram of applying an augmented reality content generator, in accordance with some embodiments.

In data flow 2000, a shopping AR content generator component is provided to "glue together" everything needed for processing AR content generators. A URI handler corresponds to a mechanism for communicating between a script (e.g., a component to enable a given AR content generator to respond to touch input, play animation and audio, modify scene objects, and the like) for a given AR content generator and a client application in HTTP-like fashion. In an implementation, the URI handler can be utilized by a shopping AR content generator to provide product metadata which can be included with a product card(s). A processor corresponds to a mechanism required by the shopping AR content generator service to listen for AR content generator lifecycle in order to attach/detach internal components and notify consumer apps, for example: prepare URI handler, prepare cards UI, etc. A shopping session is a session from the camera API and reflects ongoing sessions with shopping AR content generators and being a holder of crucial API component parts.

Figure 21:
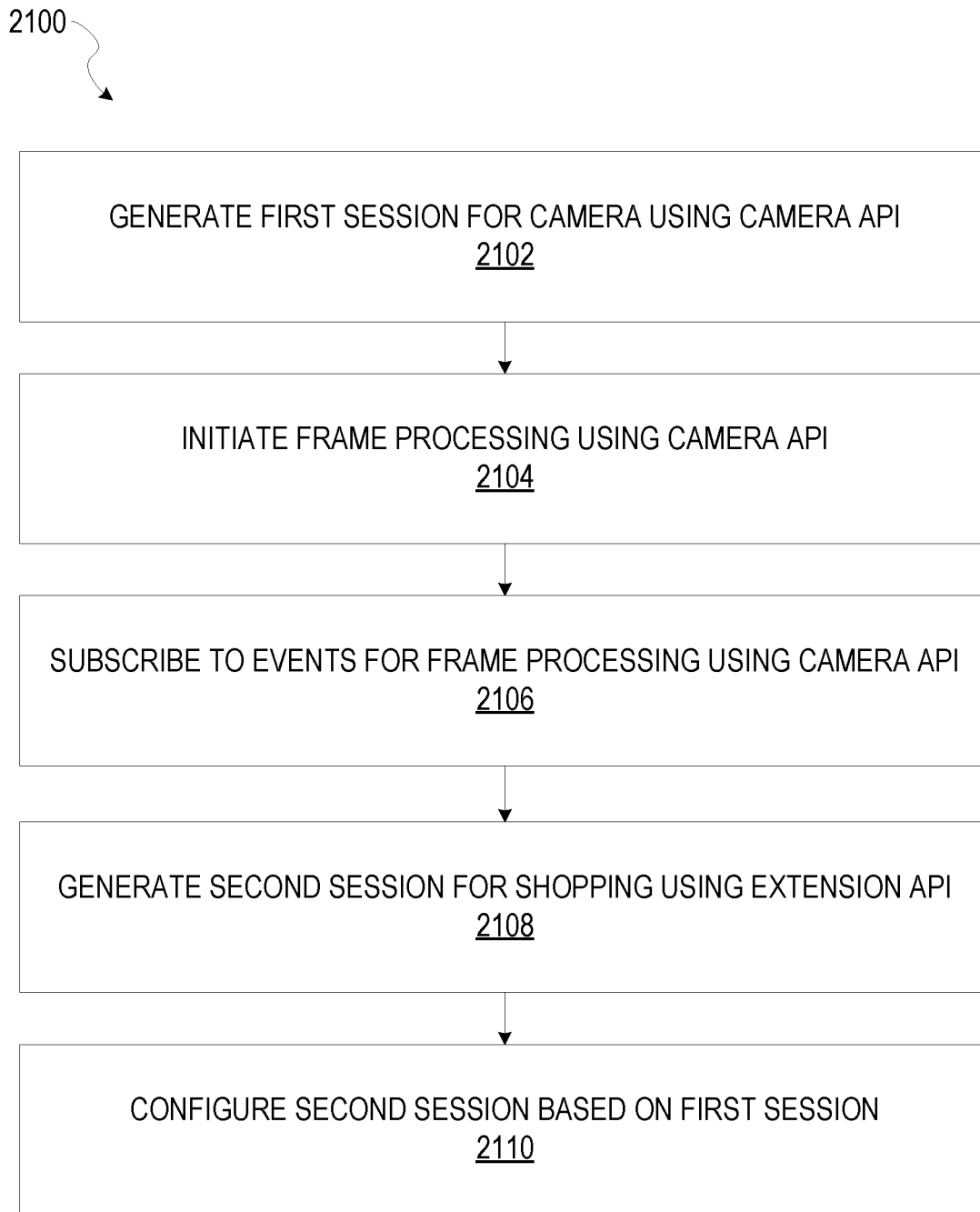
FIG. 21 is a flowchart illustrating a method, according to certain example embodiments.

FIG. 21 is a flowchart illustrating a method 2100, according to certain example embodiments. The method 2100 may be embodied in computer-readable instructions for execution by one or more computer processors such that the operations of the method 2100 may be performed in part or in whole by the messaging client application 104, particularly with respect to respective components of the annotation system 206 described above in FIG. 7, or an application executing on a given client device (e.g., client device 102) that is communicating in conjunction with messaging server system 108 and components thereof; accordingly, the method 2100 is described below by way of example with reference thereto. However, it shall be appreciated that at least some of the operations of the method 2100 may be deployed on various other hardware configurations and the method 2100 is not intended to be limited to the messaging client application 104 or any components or systems mentioned above.

At operation 2102, the client device 102 generates a first session for a camera using a camera API.

At operation 2104, the client device 102 initiates frame processing using the camera API.

At operation 2106, the client device 102 subscribes to events for frame processing using the camera API.

At operation 2108, the client device 102 generates a second session for shopping using an extension API.

At operation 2110, the client device 102 configures the second session based on the first session.

Figure 22:
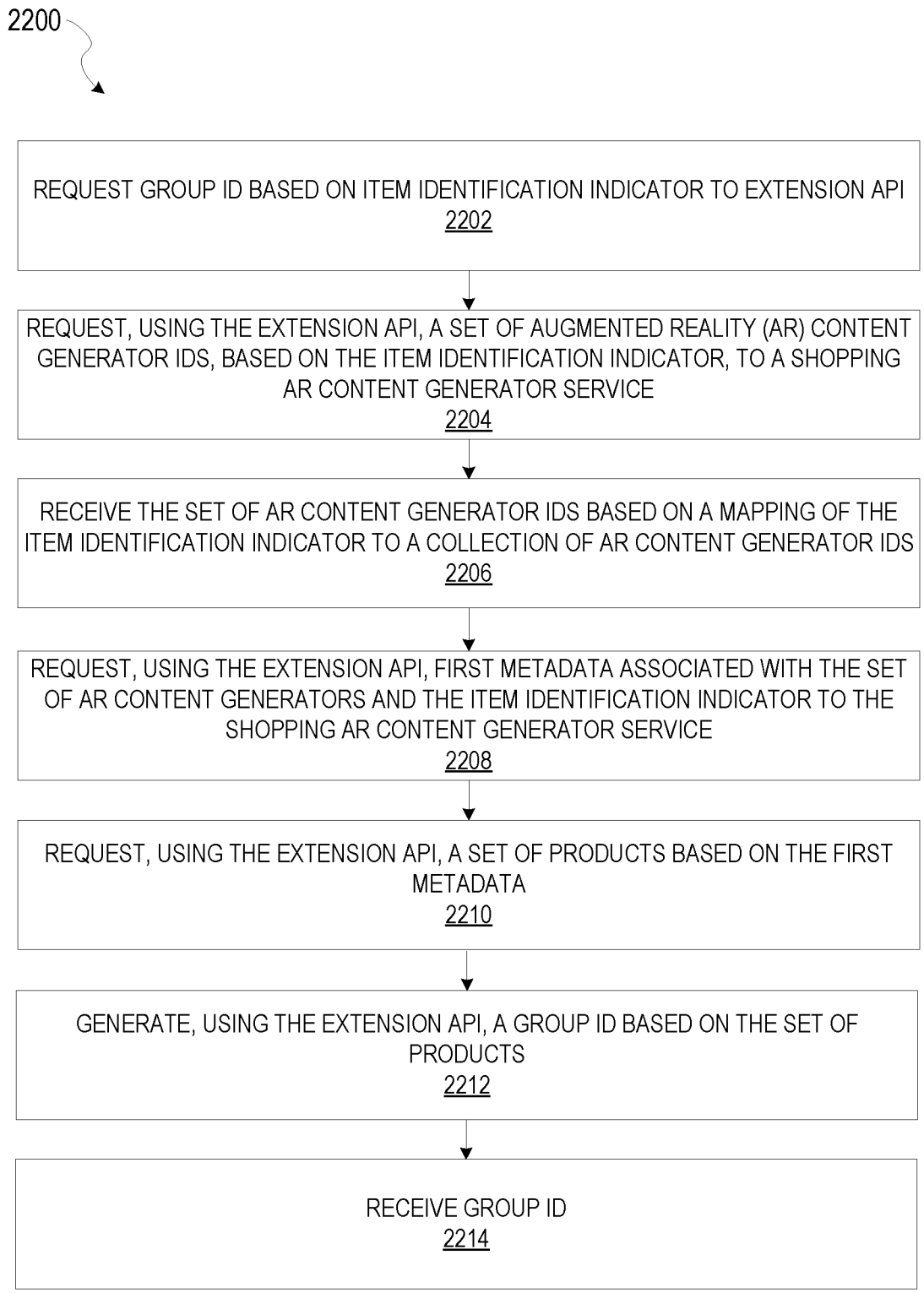
FIG. 22 is a flowchart illustrating a method, according to certain example embodiments.

FIG. 22 is a flowchart illustrating a method 2200, according to certain example embodiments. The method 2200 may be embodied in computer-readable instructions for execution by one or more computer processors such that the operations of the method 2200 may be performed in part or in whole by the messaging client application 104, particularly with respect to respective components of the annotation system 206 described above in FIG. 7, or an application executing on a given client device (e.g., client device 102) that is communicating in conjunction with messaging server system 108 and components thereof; accordingly, the method 2200 is described below by way of example with reference thereto. However, it shall be appreciated that at least some of the operations of the method 2200 may be deployed on various other hardware configurations and the method 2200 is not intended to be limited to the messaging client application 104 or any components or systems mentioned above.

At operation 2202, the client device 102 a group identifier (ID) based on an item identification indicator to an extension application programming interface (API).

At operation 2204, the client device 102 requests, using the extension API, a set of augmented reality (AR) content generator IDs, based on the item identification indicator, to a shopping AR content generator service At operation 2206, the client device 102 receives the set of AR content generator IDs based on a mapping of the item identification indicator to a collection of AR content generator IDs.

At operation 2208, the client device 102 requests, using the extension API, first metadata associated with the set of AR content generators and the item identification indicator to the shopping AR content generator service.

At operation 2210, the client device 102 requests, using the extension API, a set of products based on the first metadata.

At operation 2212, the client device 102 generates, using the extension API, a group ID based on the set of products.

At operation 2214, the client device 102 receives the group ID.

In an embodiment, the item identification indicator comprises a stock keeping unit (SKU) of a product, the product associated with a particular domain of products, the particular domain comprising beauty products.

In an embodiment, further operations performed include: mapping, by the shopping AR content generator service, the item identification indicator to the set of AR content generator IDs; and sending, by the shopping AR content generator service, the first metadata comprising the mapping of the item identification indicator to the set of AR content generator IDs.

In an embodiment, further operations performed include: receiving the first metadata by the extension API.

In an embodiment, further operations performed include: determining, by the shopping AR content generator service, the set of products based on the set of AR content generator IDs; and mapping, by the shopping AR content generator service, the set of AR content generator IDs to second metadata comprising information related to the set of products.

In an embodiment, further operations performed include: sending, by the shopping AR content generator service, particular information comprising the mapping to the extension API.

In an embodiment, further operations performed include: requesting, using the extension API, first metadata associated with the set of AR content generators and the item identification indicator to the shopping AR content generator service; retrieving, by the shopping AR content generator service, the first metadata based on the first metadata and the item identification indicator; sending, by the shopping AR content generator service, the first metadata to the extension API, the first metadata comprising information related to a second set of AR content generators associated with a camera API; requesting, using the extension API, a registration of the second set of AR content generators to the camera API; and receiving, by the extension API, a confirmation of the registration of the second set of AR content generators from the camera API.

In an embodiment, the group ID is received by a third party application, the third party application provided by a third party vendor, the third party application being separate from the extension API and the shopping AR content generator service.

In an embodiment, further operations performed include: requesting, by the third party application, a second set of AR content generators based on the group ID to a camera API; receiving, by the third party application, the second set of AR content generators from the camera API; and rendering, by the third party application, for display on a client device a set of selectable graphical items in a carousel interface, the set of selectable graphical items corresponding to the second set of AR content generators.

In an embodiment, the second set of AR content generators are associated with a domain, the domain comprising beauty products.

Figure 23:
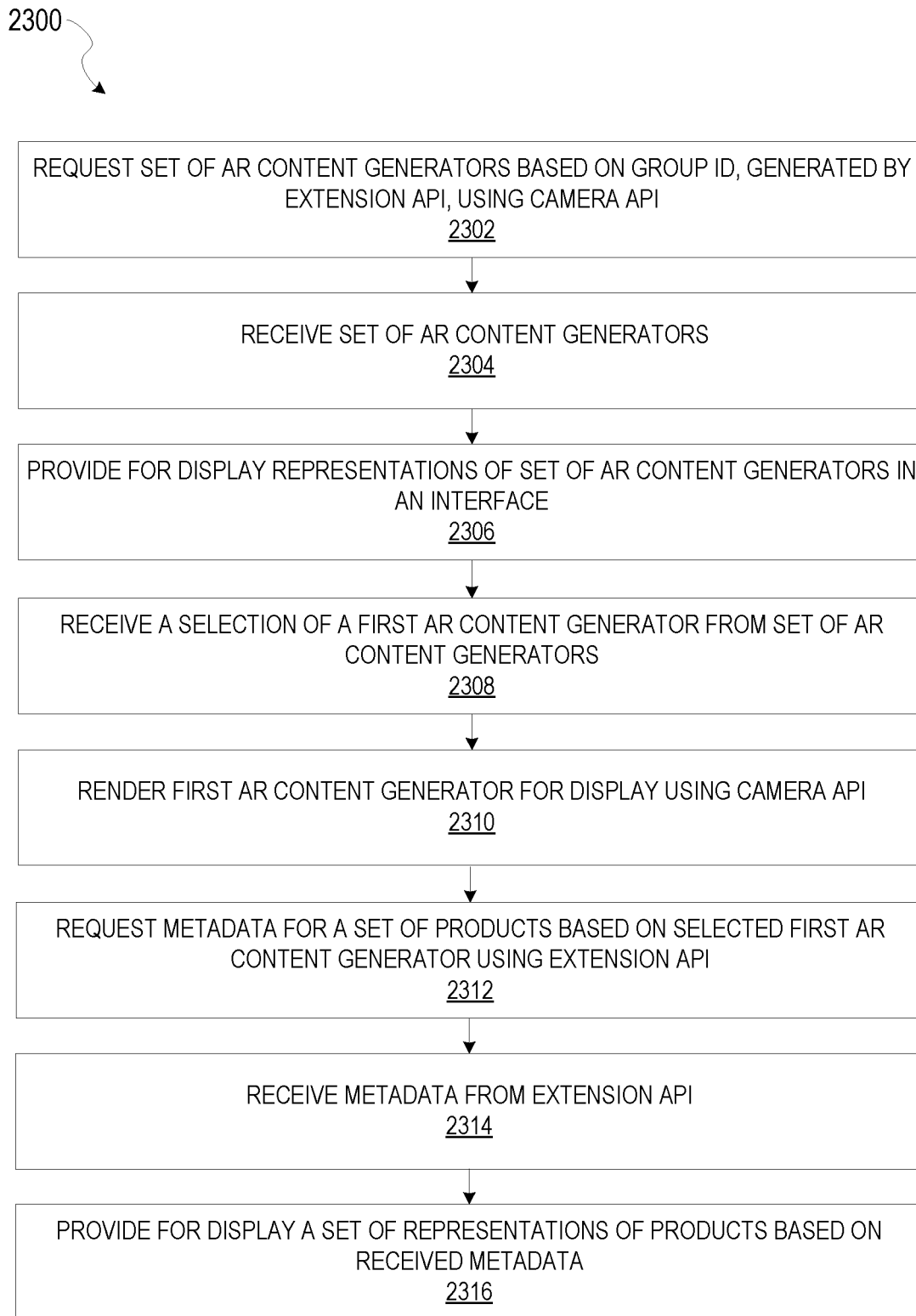
FIG. 23 is a flowchart illustrating a method, according to certain example embodiments.

FIG. 23 is a flowchart illustrating a method 2300, according to certain example embodiments. The method 2300 may be embodied in computer-readable instructions for execution by one or more computer processors such that the operations of the method 2300 may be performed in part or in whole by the messaging client application 104, particularly with respect to respective components of the annotation system 206 described above in FIG. 7, or an application executing on a given client device (e.g., client device 102) that is communicating in conjunction with messaging server system 108 and components thereof; accordingly, the method 2300 is described below by way of example with reference thereto. However, it shall be appreciated that at least some of the operations of the method 2300 may be deployed on various other hardware configurations and the method 2300 is not intended to be limited to the messaging client application 104 or any components or systems mentioned above.

At operation 2302, the client device 102 a set of augmented reality (AR) content generators based on a group ID, generated by an extension application programming interface (API), using a camera API.

At operation 2304, the client device 102 receives the set of AR content generators.

At operation 2306, the client device 102 provides for display representations of the set of AR content generators in an interface.

At operation 2308, the client device 102 receives a selection of a first AR content generator from the set of AR content generators.

At operation 2310, the client device 102 renders the first AR content generator for display, using the camera API.

At operation 2312, the client device 102 requests metadata for a set of products based on the selected first AR content generator using the extension API.

At operation 2314, the client device 102 receives the metadata from the extension API.

At operation 2316, the client device 102 provides for display the set of representations of products based on the received metadata.

In an embodiment, the extension API is a different API than the camera API, and the extension API is utilized by a third party to provide shopping related AR content generators.

In an embodiment, the first AR content generator comprises a descriptor including information for the camera API to perform a set of operations to render AR content for display on a client device.

In an embodiment, further operations performed include: querying, by the extension API, a product repository to determine product availability; and receiving, by the extension API, the metadata for the set of products.

In an embodiment, the metadata for the set of products includes one or more of product information, product description, product price, or a product image.

In an embodiment, further operations performed include: sending, by the product repository, the product metadata to the extension API; sending, by the extension API, a product state to a Uniform Resource Identifier (URI) handler; and sending, by the URI handler, the product state to an AR content generator service.

In an embodiment, further operations performed include: receiving, by the URI handler, second product metadata from the AR content generator service, the second product metadata being different from the product metadata; and sending, by the URI handler, the second product metadata to the extension API.

In an embodiment, further operations performed include: receiving the second metadata from the extension API; and providing for display the set of representations of products based on the received second metadata.

In an embodiment, the second product metadata comprises a set of additional AR content in response to an interaction, received from a user, with the set of representations of products.

In an embodiment, the group ID is derived from a product identifier, the product identifier comprises a stock-keeping unit (SKU).

Figure 24:
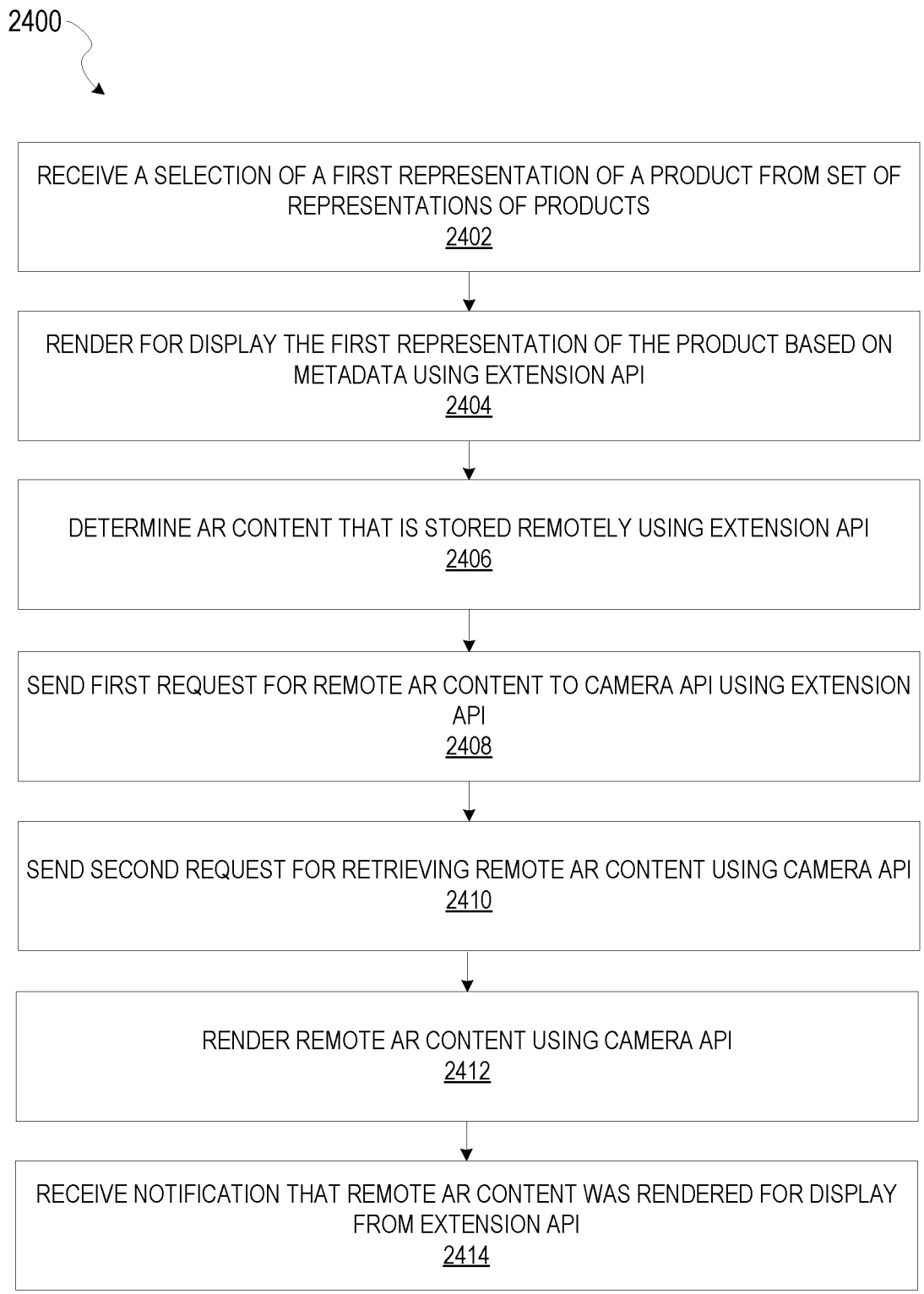
FIG. 24 is a flowchart illustrating a method, according to certain example embodiments.

FIG. 24 is a flowchart illustrating a method 2400, according to certain example embodiments. The method 2400 may be embodied in computer-readable instructions for execution by one or more computer processors such that the operations of the method 2400 may be performed in part or in whole by the messaging client application 104, particularly with respect to respective components of the annotation system 206 described above in FIG. 7, or an application executing on a given client device (e.g., client device 102) that is communicating in conjunction with messaging server system 108 and components thereof; accordingly, the method 2400 is described below by way of example with reference thereto. However, it shall be appreciated that at least some of the operations of the method 2400 may be deployed on various other hardware configurations and the method 2400 is not intended to be limited to the messaging client application 104 or any components or systems mentioned above.

At operation 2402, the client device 102 receives a selection of a first representation of a product from a set of representations of products.

At operation 2404, the client device 102 renders for display the first representation of the product based on metadata using an extension application programming interface (API), the rendering comprising the following.

At operation 2406, the client device 102 determines augmented reality (AR) content that is stored remotely using the extension API.

At operation 2408, the client device 102 sends a first request for remote AR content to a camera API using the extension API.

At operation 2410, the client device 102 sends a second request for retrieving the remote AR content using the camera API.

At operation 2412, the client device 102 renders the remote AR content using the camera API.

At operation 2414, the client device 102 receives a notification that the remote AR content was rendered for display from the extension API.

In an embodiment, the extension API is a different API than the camera API, and the extension API is utilized by a third party to provide shopping related AR content generators.

In an embodiment, further operations performed include: requesting, by the camera API, the remote AR content based on the request.

In an embodiment, the remote AR content is provided by a third party vendor that is associated with the product from the set of representations of the products.

In an embodiment, the remote AR content comprises an AR object associated with a product provided by a third party vendor.

In an embodiment, the remote AR content comprises dynamic content that is updated over a periodic basis.

In an embodiment, further operations performed include: prior to receiving the selection of the first representation, rendering the set of representations of products based on first metadata associated with the set of representations of products, and wherein rendering for display the first representation further comprises: sending, to the extension API, a particular request to apply the remote AR content based on second metadata associated with the first representation of the product; in response to the particular request, mapping, by the extension API, the second metadata to the remote AR content, the remote AR content being stored at a separate storage device over a network that is hosted by a third party vendor; generating third metadata comprising the mapping of the second metadata to the remote AR content; and sending, by the extension API, the third metadata to the camera API, the third metadata being included in the first request.

In an embodiment, rendering for display the first representation further comprises: receiving, by the camera API, the third metadata included in the first request; in response to the first request, retrieving the remote AR content based on the third metadata; sending, by the camera API, a particular notification to the extension API confirming that the remote AR content was rendered; and in response to the particular notification, sending, by the extension API, the notification that the remote AR content was rendered for display.

In an embodiment, the selection of the first representation is received by a third party application, the third party application provided by a third party vendor, the third party application being separate from the camera API and the extension API.

In an embodiment, rendering for display the first representation of the product is initiated by a third party application, the third party application provided by a third party vendor, the third party application being separate from the camera API and the extension API.

Figure 25:
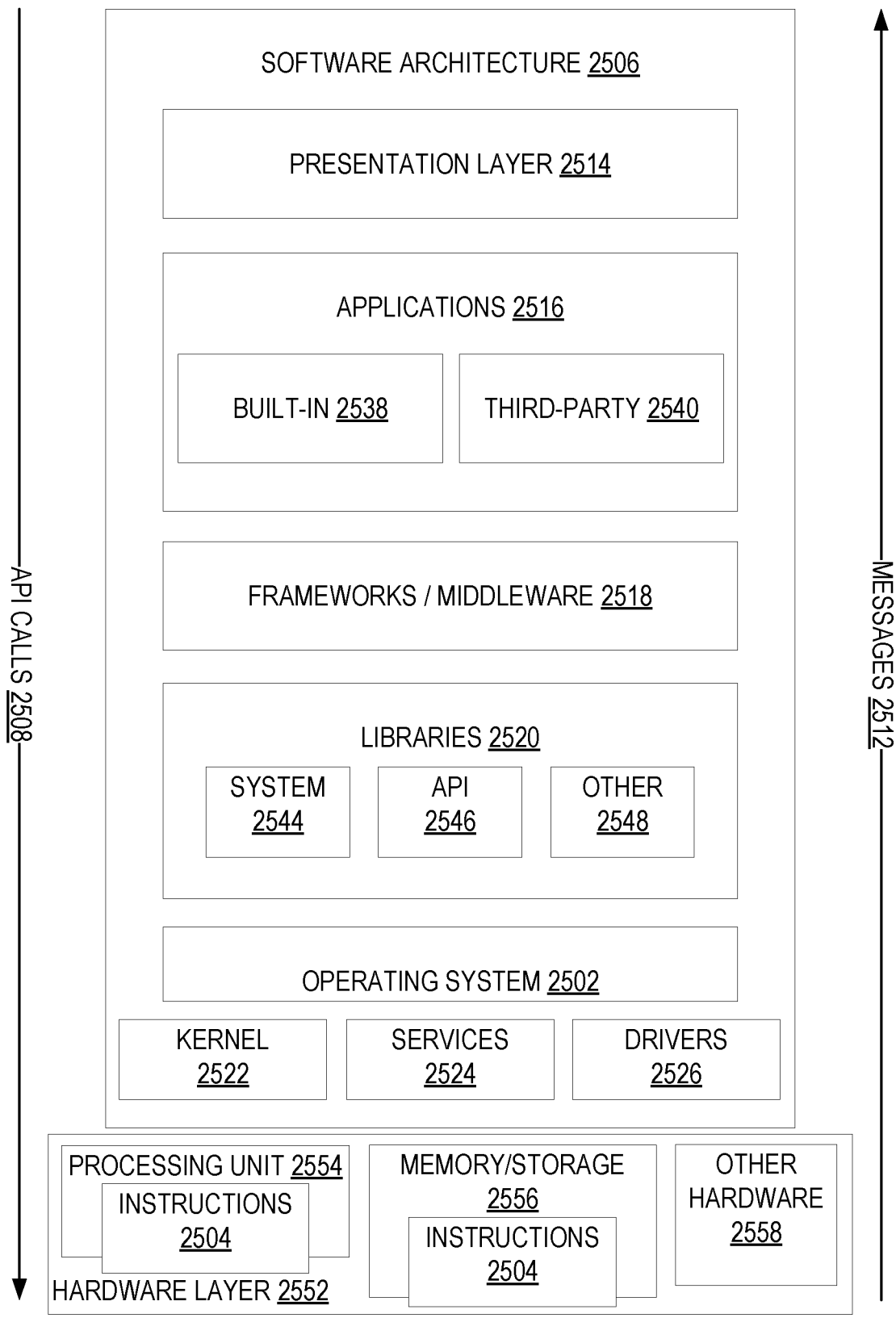
FIG. 25 is block diagram showing a software architecture within which the present disclosure may be implemented, in accordance with some example embodiments.

FIG. 25 is a block diagram illustrating an example software architecture 2506, which may be used in conjunction with various hardware architectures herein described. FIG. 25 is a non-limiting example of a software architecture and it will be appreciated that many other architectures may be implemented to facilitate the functionality described herein. The software architecture 2506 may execute on hardware such as machine 2600 of FIG. 26 that includes, among other things, processors 2604, memory 2614, and (input/output) I/O components 2618. A representative hardware layer 2552 is illustrated and can represent, for example, the machine 2600 of FIG. 26. The representative hardware layer 2552 includes a processing unit 2554 having associated executable instructions 2504. Executable instructions 2504 represent the executable instructions of the software architecture 2506, including implementation of the methods, components, and so forth described herein. The hardware layer 2552 also includes memory or storage modules memory/storage 2556, which also have executable instructions 2504. The hardware layer 2552 may also comprise other hardware 2558.

In the example architecture of FIG. 25, the software architecture 2506 may be conceptualized as a stack of layers where each layer provides particular functionality. For example, the software architecture 2506 may include layers such as an operating system 2502, libraries 2520, frameworks/middleware 2518, applications 2516, and a presentation layer 2514. Operationally, the applications 2516 or other components within the layers may invoke API calls 2508 through the software stack and receive a response as in messages 2512 to the API calls 2508. The layers illustrated are representative in nature and not all software architectures have all layers. For example, some mobile or special purpose operating systems may not provide a frameworks/middleware 2518, while others may provide such a layer. Other software architectures may include additional or different layers.

The operating system 2502 may manage hardware resources and provide common services. The operating system 2502 may include, for example, a kernel 2522, services 2524, and drivers 2526. The kernel 2522 may act as an abstraction layer between the hardware and the other software layers. For example, the kernel 2522 may be responsible for memory management, processor management (e.g., scheduling), component management, networking, security settings, and so on. The services 2524 may provide other common services for the other software layers. The drivers 2526 are responsible for controlling or interfacing with the underlying hardware. For instance, the drivers 2526 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2520 provide a common infrastructure that is used by the applications 2516 or other components or layers. The libraries 2520 provide functionality that allows other software components to perform tasks in an easier fashion than to interface directly with the underlying operating system 2502 functionality (e.g., kernel 2522, services 2524 or drivers 2526). The libraries 2520 may include system libraries 2544 (e.g., C standard library) that may provide functions such as memory allocation functions, string manipulation functions, mathematical functions, and the like. In addition, the libraries 2520 may include API libraries 2546 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 2520 may also include a wide variety of other libraries 2548 to provide many other APIs to the applications 2516 and other software components/modules.

The frameworks/middleware 2518 (also sometimes referred to as middleware) provide a higher-level common infrastructure that may be used by the applications 2516 or other software components/modules. For example, the frameworks/middleware 2518 may provide various graphic user interface (GUI) functions, high-level resource management, high-level location services, and so forth. The frameworks/middleware 2518 may provide a broad spectrum of other APIs that may be used by the applications 2516 or other software components/modules, some of which may be specific to a particular operating system 2502 or platform.

The applications 2516 include built-in applications 2538 or third-party applications 2540. Examples of representative built-in applications 2538 may include, but are not limited to, a contacts application, a browser application, a book reader application, a location application, a media application, a messaging application, or a game application. Third-party applications 2540 may include an application developed using the ANDROID™ or IOS™ software development kit (SDK) by an entity other than the vendor of the particular platform, and may be mobile software running on a mobile operating system such as IOS™, ANDROID™ WINDOWS® Phone, or other mobile operating systems. The third-party applications 2540 may invoke the API calls 2508 provided by the mobile operating system (such as operating system 2502) to facilitate functionality described herein.

The applications 2516 may use built in operating system functions (e.g., kernel 2522, services 2524 or drivers 2526), libraries 2520, and frameworks/middleware 2518 to create user interfaces to interact with users of the system. Alternatively, or additionally, in some systems interactions with a user may occur through a presentation layer, such as presentation layer 2514. In these systems, the application/component 'logic' can be separated from the aspects of the application/component that interact with a user.

Figure 26:
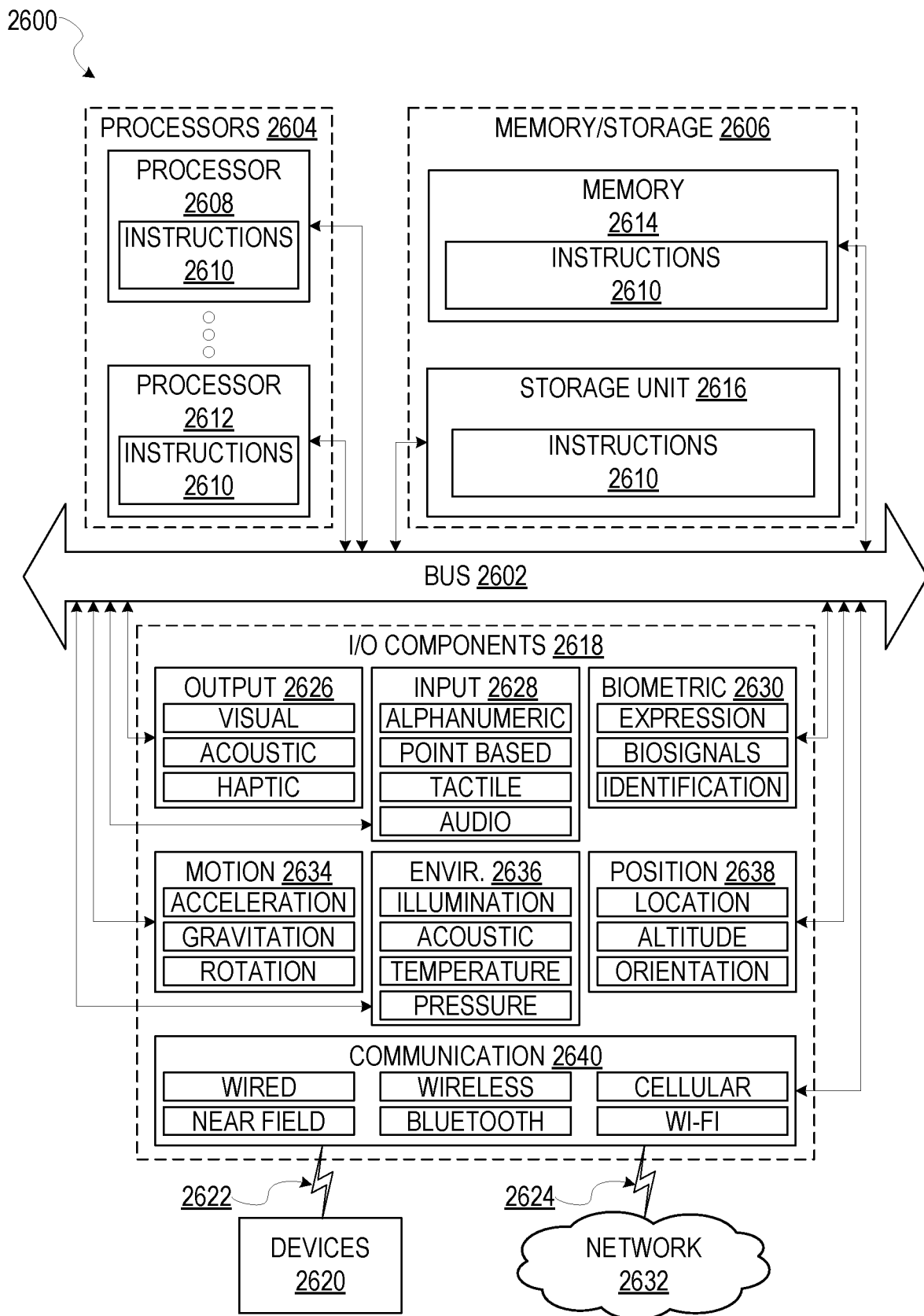
FIG. 26 is a diagrammatic representation of a machine, in the form of a computer system within which a set of instructions may be executed for causing the machine to perform any one or more of the methodologies discussed, in accordance with some example embodiments.

FIG. 26 is a block diagram illustrating components of a machine 2600, according to some example embodiments, able to read instructions from a machine-readable medium (e.g., a machine-readable storage medium) and perform any one or more of the methodologies discussed herein. Specifically, FIG. 26 shows a diagrammatic representation of the machine 2600 in the example form of a computer system, within which instructions 2610 (e.g., software, a program, an application, an applet, an app, or other executable code) for causing the machine 2600 to perform any one or more of the methodologies discussed herein may be executed. As such, the instructions 2610 may be used to implement modules or components described herein. The instructions 2610 transform the general, non-programmed machine 2600 into a particular machine 2600 programmed to carry out the described and illustrated functions in the manner described. In alternative embodiments, the machine 2600 operates as a standalone device or may be coupled (e.g., networked) to other machines. In a networked deployment, the machine 2600 may operate in the capacity of a server machine or a client machine in a server-client network environment, or as a peer machine in a peer-to-peer (or distributed) network environment. The machine 2600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2610, sequentially or otherwise, that specify actions to be taken by machine 2600. Further, while only a single machine 2600 is illustrated, the term 'machine' shall also be taken to include a collection of machines that individually or jointly execute the instructions 2610 to perform any one or more of the methodologies discussed herein.

The machine 2600 may include processors 2604, including processor 2608 to processor 2612, memory/storage 2606, and I/O components 2618, which may be configured to communicate with each other such as via a bus 2602. The memory/storage 2606 may include a memory 2614, such as a main memory, or other memory storage, and a storage unit 2616, both accessible to the processors 2604 such as via the bus 2602. The storage unit 2616 and memory 2614 store the instructions 2610 embodying any one or more of the methodologies or functions described herein. The instructions 2610 may also reside, completely or partially, within the memory 2614, within the storage unit 2616, within at least one of the processors 2604 (e.g., within the processor's cache memory), or any suitable combination thereof, during execution thereof by the machine 2600. Accordingly, the memory 2614, the storage unit 2616, and the memory of processors 2604 are examples of machine-readable media.

The I/O components 2618 may include a wide variety of components to receive input, provide output, produce output, transmit information, exchange information, capture measurements, and so on. The specific I/O components 2618 that are included in a particular machine 2600 will depend on the type of machine. For example, portable machines such as mobile phones will likely include a touch input device or other such input mechanisms, while a headless server machine will likely not include such a touch input device. It will be appreciated that the I/O components 2618 may include many other components that are not shown in FIG. 26. The I/O components 2618 are grouped according to functionality merely for simplifying the following discussion and the grouping is in no way limiting. In various example embodiments, the I/O components 2618 may include output components 2626 and input components 2628. The output components 2626 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2628 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like.

In further example embodiments, the I/O components 2618 may include biometric components 2630, motion components 2634, environmental components 2636, or position components 2638 among a wide array of other components. For example, the biometric components 2630 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2634 may include acceleration sensor components (e.g., accelerometer), gravitation sensor components, rotation sensor components (e.g., gyroscope), and so forth. The environmental components 2636 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2638 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2618 may include communication components 2640 operable to couple the machine 2600 to a network 2632 or devices 2620 via coupling 2624 and coupling 2622, respectively. For example, the communication components 2640 may include a network interface component or other suitable device to interface with the network 2632. In further examples, communication components 2640 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2620 may be another machine or any of a wide variety of peripheral devices (e.g., a peripheral device coupled via a USB).

Moreover, the communication components 2640 may detect identifiers or include components operable to detect identifiers. For example, the communication components 2640 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2640, such as, location via Internet Protocol (IP) geo-location, location via Wi-Fi® signal triangulation, location via detecting a NFC beacon signal that may indicate a particular location, and so forth.

The following discussion relates to various terms or phrases that are mentioned throughout the subject disclosure.

'Signal Medium' refers to any intangible medium that is capable of storing, encoding, or carrying the instructions for execution by a machine and includes digital or analog communications signals or other intangible media to facilitate communication of software or data. The term 'signal medium' shall be taken to include any form of a modulated data signal, carrier wave, and so forth. The term 'modulated data signal' means a signal that has one or more of its characteristics set or changed in such a matter as to encode information in the signal. The terms 'transmission medium' and 'signal medium' mean the same thing and may be used interchangeably in this disclosure.

'Communication Network' refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

'Processor' refers to any circuit or virtual circuit (a physical circuit emulated by logic executing on an actual processor) that manipulates data values according to control signals (e.g., 'commands', 'op codes', 'machine code', etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as 'cores') that may execute instructions contemporaneously.

'Machine-Storage Medium' refers to a single or multiple storage devices or media (e.g., a centralized or distributed database, or associated caches and servers) that store executable instructions, routines or data. The term shall accordingly be taken to include, but not be limited to, solid-state memories, and optical and magnetic media, including memory internal or external to processors. Specific examples of machine-storage media, computer-storage media or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms 'machine-storage medium,' 'device-storage medium,' 'computer-storage medium' mean the same thing and may be used interchangeably in this disclosure. The terms 'machine-storage media,' 'computer-storage media,' and 'device-storage media' specifically exclude carrier waves, modulated data signals, and other such media, at least some of which are covered under the term 'signal medium.'

'Component' refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A 'hardware component' is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase 'hardware component'(or 'hardware-implemented component') should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, 'processor-implemented component' refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a 'cloud computing' environment or as a 'software as a service' (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

'Carrier Signal' refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

'Computer-Readable Medium' refers to both machine-storage media and transmission media. Thus, the terms include both storage devices/media and carrier waves/modulated data signals. The terms 'machine-readable medium,' 'computer-readable medium' and 'device-readable medium' mean the same thing and may be used interchangeably in this disclosure.

'Client Device' refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network. In the subject disclosure, a client device is also referred to as an 'electronic device.'

'Ephemeral Message' refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

What is claimed is:

1. A method, comprising:
receiving a selection of a first representation of a product from a set of representations of products;
rendering for display the first representation of the product from the set of representations of products based on metadata using an extension application programming interface (API), the rendering comprising:
determining augmented reality (AR) content that is stored remotely using the extension API;
sending a first request for remote AR content to a camera API using the extension API;
sending a second request for retrieving the remote AR content using the camera API;
sending, to the extension API a particular request to apply the remote AR content based on second metadata associated with the first representation of the product from the set of representations of products; and
in response to the particular request, mapping, by the extension API the second metadata to the remote AR content, the remote AR content being stored at a separate storage device over a network that is hosted by a third party vendor;
rendering the remote AR content using the camera API, wherein rendering for display the first representation of the product is initiated by a third party application, the third party application provided by the third party vendor that is different from an entity that provides the camera API and the extension API, the third party application being separate and distinct from the camera API and the extension API; and
receiving a notification that the remote AR content was rendered for display from the extension API.

2. The method of claim 1, wherein the extension API is a different API than the camera API, and the extension API is utilized by a third party to provide shopping related AR content generators.

3. The method of claim 1, further comprising:
requesting, by the camera API, the remote AR content based on the particular request.

4. The method of claim 3, wherein the remote AR content is provided by the third party vendor that is associated with the product from the set of representations of the products.

5. The method of claim 1, wherein the remote AR content comprises an AR object associated with a product provided by the third party vendor.

6. The method of claim 1, wherein the remote AR content comprises dynamic content that is updated over a periodic basis.

7. The method of claim 1, further comprising:
prior to receiving the selection of the first representation, rendering the set of representations of products based on first metadata associated with the set of representations of products, and wherein rendering for display the first representation further comprises:
generating third metadata comprising the mapping of the second metadata to the remote AR content; and
sending, by the extension API, the third metadata to the camera API, the third metadata being included in the first request.

8. The method of claim 7, wherein rendering for display the first representation further comprises:
receiving, by the camera API, the third metadata included in the first request;
in response to the first request, retrieving the remote AR content based on the third metadata;
sending, by the camera API, a particular notification to the extension API confirming that the remote AR content was rendered; and
in response to the particular notification, sending, by the extension API, the notification that the remote AR content was rendered for display.

9. A system comprising:
a processor; and
a memory including instructions that, when executed by the processor, cause the processor to perform operations comprising:
receiving a selection of a first representation of a product from a set of representations of products;
rendering for display the first representation of the product from the set of representations of products based on metadata using an extension application programming interface (API), the rendering comprising:
determining augmented reality (AR) content that is stored remotely using the extension API;
sending a first request for remote AR content to a camera API using the extension API;
sending a second request for retrieving the remote AR content using the camera API;
sending, to the extension APL a particular request to apply the remote AR content based on second metadata associated with the first representation of the product from the set of representations of products; and
in response to the particular request, mapping, by the extension APL the second metadata to the remote AR content, the remote AR content being stored at a separate storage device over a network that is hosted by a third party vendor;
rendering the remote AR content using the camera API, wherein rendering for display the first representation of the product is initiated by a third party application, the third party application provided by the third party vendor that is different from an entity that provides the camera API and the extension API, the third party application being separate and distinct from the camera API and the extension API; and
receiving a notification that the remote AR content was rendered for display from the extension API.

10. The system of claim 9, wherein the extension API is a different API than the camera API, and the extension API is utilized by a third party to provide shopping related AR content generators.

11. The system of claim 9, wherein the operations further comprise: requesting, by the camera API, the remote AR content based on the particular request.

12. The system of claim 11, wherein the remote AR content is provided by the third party vendor that is associated with the product from the set of representations of the products.

13. The system of claim 9, wherein the remote AR content comprises an AR object associated with a product provided by the third party vendor.

14. The system of claim 9, wherein the remote AR content comprises dynamic content that is updated over a periodic basis.

15. The system of claim 9, wherein the operations further comprise:
prior to receiving the selection of the first representation, rendering the set of representations of products based on first metadata associated with the set of representations of products, and wherein rendering for display the first representation further comprises:
  generating third metadata comprising the mapping of the second metadata to the remote AR content; and
  sending, by the extension API, the third metadata to the camera API, the third metadata being included in the first request.

16. The system of claim 15, wherein rendering for display the first representation further comprises:
  receiving, by the camera API, the third metadata included in the first request;
  in response to the first request, retrieving the remote AR content based on the third metadata;
  sending, by the camera API, a particular notification to the extension API confirming that the remote AR content was rendered; and
  in response to the particular notification, sending, by the extension API, the notification that the remote AR content was rendered for display.

17. A non-transitory computer-readable medium comprising instructions, which when executed by a computing device, cause the computing device to perform operations comprising:
  receiving a selection of a first representation of a product from a set of representations of products;
  rendering for display the first representation of the product from the set of representations of products based on metadata using an extension application programming interface (API), the rendering comprising:
  determining augmented reality (AR) content that is stored remotely using the extension API;
  sending a first request for remote AR content to a camera API using the extension API;
  sending a second request for retrieving the remote AR content using the camera API;
  sending, to the extension API a particular request to apply the remote AR content based on second metadata associated with the first representation of the product from the set of representations of products; and
  in response to the particular request, mapping, by the extension APL the second metadata to the remote AR content, the remote AR content being stored at a separate storage device over a network that is hosted by a third party vendor;
  rendering the remote AR content using the camera API, wherein rendering for display the first representation of the product is initiated by a third party application, the third party application provided by the third party vendor that is different from an entity that provides the camera API and the extension API, the third party application being separate and distinct from the camera API and the extension API; and
  receiving a notification that the remote AR content was rendered for display from the extension API.

* * * * *